United States Patent [19]
Imai et al.

[11] Patent Number: 5,585,952
[45] Date of Patent: Dec. 17, 1996

[54] COMMUNICATION APPARATUS AUTOMATICALLY SELECTING ONE OF TWO OPERATION MODES

[75] Inventors: Akira Imai; Yuji Ichikawa, both of Nara; Kaoru Hieda, Kitakatsuragi-gun; Masahiko Tsukamoto, Nara, all of Japan

[73] Assignee: Sharp Kabushiki Kaisha, Osaka, Japan

[21] Appl. No.: 471,757

[22] Filed: Jun. 6, 1995

[30] Foreign Application Priority Data

Jul. 26, 1994 [JP] Japan ..................... 6-173899

[51] Int. Cl.⁶ ..................... H04J 14/08
[52] U.S. Cl. ............ 359/135; 359/152; 340/825.44; 379/56
[58] Field of Search ............ 359/136, 109, 359/147, 152, 158, 172, 181, 135; 340/825.44; 379/55–56; 395/200.09, 500, 831

[56] References Cited

U.S. PATENT DOCUMENTS 5,444,438  8/1995  Goldberg .................. 340/825.44
5,459,457  10/1995  Sharpe .................... 340/825.44

FOREIGN PATENT DOCUMENTS 5-292146-A  11/1993  Japan .

OTHER PUBLICATIONS

English-language abstract of Wakimoto/Sony Corp. JP 5-292 146-A.

Primary Examiner—Wellington Chin
Assistant Examiner—Kinfe-Michael Negash
Attorney, Agent, or Firm—David G. Conlin; Milton Oliver

[57] ABSTRACT

A communication apparatus includes a memory. The memory stores the protocol of an ASK system and the protocol of an IrDA system. These protocols require predetermined time periods of T1 and T2 prior to establishing a connection with a station of the other party. The memory further stores time periods of Ra, Rb, Sa, and Sb, where the relationship of (Ra+Rb)≠(Sa+Sb), Sa>T1, Sb>T2, Rb>T2 is established. The communication apparatus further includes a transmission circuit and a reception circuit for the ASK system, a transmission circuit and a reception circuit for the IrDA system, a timer, and a control circuit. The control circuit controls the transmission circuit, the reception circuit, and the timer while referring to the stored contents of the memory. The control circuit carries out a "handshaking" procedure with the station of the other party, alternately trying the ASK protocol and the IrDA protocol until it is determined which of the two protocols the two stations have in common, and setting a flag signal to select the fastest transmission protocol which the two stations have in common. The selected protocol is thereafter used for communication between the two stations.

12 Claims, 19 Drawing Sheets

COMMUNICATION APPARATUS AUTOMATICALLY SELECTING ONE OF TWO OPERATION MODES

BACKGROUND OF THE INVENTION

1. Field of the Invention

The present invention relates to data communication apparatuses for information tools, and more particularly, to a communication apparatus using light such as infrared rays as a medium.

2. Description of the Background Art

The need of portable information tools such as electronic organizers or the like seems insatiable. The demand for wireless communication features incorporated in such information tools to be available in various environments and immune to external noise is great due to the portability of the information tools. As the medium of wireless communication, infrared rays are widely used since there are no statutes or regulations pertaining thereto and by virtue of their low cost.

An infrared communication system (referred to as "ASK system" hereinafter) employing ASK (Amplitude Shift Keying) as a modulation method on the basis a carrier and a subcarrier is known as a data communication system using infrared rays. Such a system is incorporated in various information tools such as electronic organizers. "Zaurus" (product name) TYPE PI-3000 and "NEWTON" (product name) TYPE PI-7000 are such exemplary apparatuses produced by Sharp Corporation.

In an ASK system, an infrared ray having a wavelength peak value in the range of 900–1050 nm is used in a physical layer. Communication is carried out using an ASK modulation where the frequency of a subcarrier is 500 kHz. In a transmission mode, a light emitting diode is energized using a rectangular wave of 500 kHz when data is 0 and the light emitting diode is deenergized when data is 1 as shown in FIG. 2.

FIG. 4 shows a protocol of a data link layer according to an ASK system with the time plotted along the abscissa. Referring to FIG. 4(a), a transmitting station sends an ENQ packet to check whether there is a receiving station to which data is to be sent. Upon receiving an ENQ packet, the receiving station transmits a SYN packet indicating that reception is allowed. Upon receiving the SYN packet, the transmitting station sends a DATA packet including data. The receiving station outputs an ACK packet when the data packet is properly received. When the transmitting station does not receive a SYN packet at an elapse of a predetermined time period after transmission of an ENQ packet, the transmitting station repeats transmission of an ENQ packet. In FIG. 4, retransmission of an ENQ packet is carried out three times.

Another infrared communication system using only a carrier on the basis of a pulse (referred to as "IrDA (Infrared Data Association) system" hereinafter) is also being realized as a data communication system.

In the IrDA system, an infrared ray having a wavelength peak value of 850 nm is used in a physical layer. As shown in FIG. 3, the light emitting diode is energized for 3/16 and deenergized for 13/16 of the time slot when data is zero at the time of transmission. When data is 1, the light emitting slot is altogether deenergized during that time slot. This transmission scheme is not dependent upon the data transfer rate.

FIG. 5 shows the protocol of a data link layer in the case of an IrDA system (referred to as "IrLAP (Infrared Link Access Protocol) hereinafter") with the time plotted along the abscissa. When either the transmitting or receiving station is establishing a connection, one station 1 monitors the media for 500 milliseconds from the start of the transmission, and sends a Discovery-XID (eXchange station IDentification)-Cmd (Command) packet if there is no traffic found during the period of 500 milliseconds. The address of that one station is included in this packet.

When that station 1 receives a packet addressed to itself during the monitor operation of the media for 500 milliseconds, the transmission is interrupted to respond to that packet. The above-described procedure can be attempted again when there is some traffic not related to its own station.

Station 1 carrying out transmission of a Discovery-XID-Cmd packet can set the number of Discovery-XID-Cmd packets (number of slots) according to the requirement of how many stations the connection is to be established with. The number of the entire slots is written in all the Discovery-XID-Cmd packets. A station 2 receiving this packet selects an appropriate slot according to a random number and returns a Discovery-XID-Rsp (Response) packet during the time slot of a Discovery-XID-Cmd packet and an End-Discovery-XID-Cmd packet indicating the end of the packet. Thus, station 1 is notified of discovery of the other party station (station 2) (corresponding to "discovery" in FIG. 5). The address of the discovered other party station is included in this packet. When the other party station is not discovered, station 1 retransmits multiple Discovery-XID-Cmd packets.

Following the discovery of station 2, station 1 transmits an SNRM (Set Normal Response Mode)-Command-Frame packet. Station 2 receiving this SNRM-Command-Frame packet responds by sending an SNRM-Command-Frame packet, whereby the operation of establishing a connection is completed (corresponds to "connect" in FIG. 5).

Following the establishment of a connection between stations 1 and 2, station 1 sends a Frame packet to station 2 to transmit data (corresponds to "information exchange" in FIG. 5).

Lastly, station 1 attempting to disconnect the connection sends an Unsequenced-Cmd packet. Station 2 receiving this packet returns an Unsequenced-Rsp packet, whereby the communication ends (corresponds to "disconnect" in FIG. 5).

It should be noted that the above-described protocol is a typical example and is subject to modifications except for the "discovery" process.

The ASK system is dedicated to a one-to-one communication. In contrast, the IrDA system allows a connection to be established with a plurality of stations at the same time i.e. "a one-to-multiple" communication. Therefore, a "discovery" procedure is required before data is transmitted in the IrDA system. In the ASK system, there is no packet exchange corresponding to "discovery" in the IrDA system since it is not necessary to identify how many stations there are as the other party. The packet exchange of packets ENQ and SYN of the ASK system corresponds to the "connect" in the IrDA system.

It is to be noted that in the ASK system, the procedure of a transmitting station and the procedure of a receiving station in establishing a connection is definitely divided. More specifically, the station transmitting data sends an ENQ packet, and the receiving station sends a SYN packet. In contrast, the role of the transmitting station and the receiving station is not divided even after a connection is established in the IrDA system.

Although the ASK system and IrDA system are both infrared communication systems, they were planned independently of each other. Therefore, there was no compatibility between the protocols of a physical layer and a data link layer. This means that one of the ASK and IrDA systems becomes the noise of the other system.

Even in the case where a circuit is incorporated in which transmission and reception of both systems are allowed, it was necessary to settle the method before a transmission/receiving operation since there is difference in protocol therebetween. It was necessary to specify by which of the systems of ASK and IrDA the communication is to be carried out, prior to the transmission/receiving operation in both the transmission apparatus and the reception apparatus. There is also a possibility of communication being disabled due to erroneous specification of a system. A novice user may not be aware of this cause, and assume that a malfunction has occurred or that he/she is out of range of the allowable receiving region.

Furthermore, the ASK system and the IrDA system have different transfer rates. The upper limit of the transfer rate of the ASK system is defined as 9600 bps (bit per second), whereas the upper limit of the transfer rate of the IrDA system is defined as 115.2 kbps. It is desirable that the system of a higher transfer rate is selected automatically when both of the ASK system and the IrDA system are allowed between two stations.

There is also a problem that frequency conversion cannot be carried out easily when the communication media is an infrared ray in contrast to the case where an radio frequency is used. This is because a light emitting diode or a semiconductor laser is used as the transmitting unit of infrared ray and a photodiode is used in the receiving unit. Therefore, the wavelength that can be used for transmission and reception can not be changed.

SUMMARY OF THE INVENTION

In view of the foregoing, an object of the present invention is to provide a communication apparatus that can identify and select automatically by a handshaking procedure which of an ASK system or an IrDA system is to be used for transmission and reception without the need of specification by a user.

Another object of the present invention is to provide a communication apparatus that can automatically select an IrDA system of a higher communication rate when both an ASK system and IrDA system are allowed.

A further object of the present invention is to allow easy modification of a communication system from an ASK system to an IrDA system in a communication apparatus employing infrared rays with a simple apparatus hardware and without having multiple transmitters and receivers.

A communication apparatus according to the present invention includes a memory. The memory stores a first communication protocol and second communication protocol. Each of the first and second communication protocols requires a predetermined time T1 and T2 prior to establishing a connection with another station employing the same procedure. The memory further stores time periods Ra, Rb, Sa and Sb satisfying the following conditions of:

$(Ra+Rb) \neq (Sa+Sb)$
$Sa > T1$
$Sb > T2$
$Rb > T2$

The communication apparatus further includes a first transmission circuit for transmitting a signal when the first communication protocol is to be executed, a first reception circuit for receiving a signal when the first communication protocol is to be executed, a second transmission circuit for transmitting a signal when the second communication protocol is to be executed, a second reception circuit for receiving a signal when the second communication protocol is to be executed, a timer, and a control circuit. The control circuit controls the first and second transmission circuits and the first and second reception circuits and the timer while referring to the stored contents of the memory. The control circuit alternately selects the first and second communication protocols when the communication apparatus operates as a receiving station and repeats execution of the selected protocols for respective time periods Ra and Rb. When the communication apparatus operates as a transmitting station, the control circuit alternately selects the first and second communication protocols and repeats the execution of the selected protocol for respective time periods of Sa and Sb. The control circuit repeats the above operation until a connection is established with another station using the same protocol.

In this communication apparatus, the first and second communication protocols are alternately switched and executed. Since the repetition cycle period (Ra+Rb) at the receiving station is not equal to the repetition cycle period of (Sa+Sb) at the transmitting station, the receiving station and the transmitting station that can communicate with each other can reliably identify the other party station by repeating the above sequence a finite number of times, whereby the step of establishing a connection can be initiated. It is not necessary to set the communication protocol identical to each other beforehand.

When the second communication protocol is advantageous over the procedure of the first communication protocol, a flag signal is preferably included in the signal transmitted by the first transmission circuit at the first communication protocol indicating that the communication apparatus has the ability of executing the second communication protocol. The control circuit responds to a flag signal in a signal received during execution of an operation for establishing a connection in the first communication protocol to fixedly select the second communication protocol and carries out an operation for connection with the other party station. Thus, the communication apparatuses of the present invention has the effect that the second communication protocol is always selected.

Preferably, the first and second transmission circuits and the first and second reception circuits use infrared rays as the communication media. The first communication protocol is, for example, the ASK system, and the second communication protocol is, for example, the IrDA system. The time periods of Ra, Rb, Sa, and Sb are 700 msec., 1200 msec., 500 msec., and 1380 msec., respectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
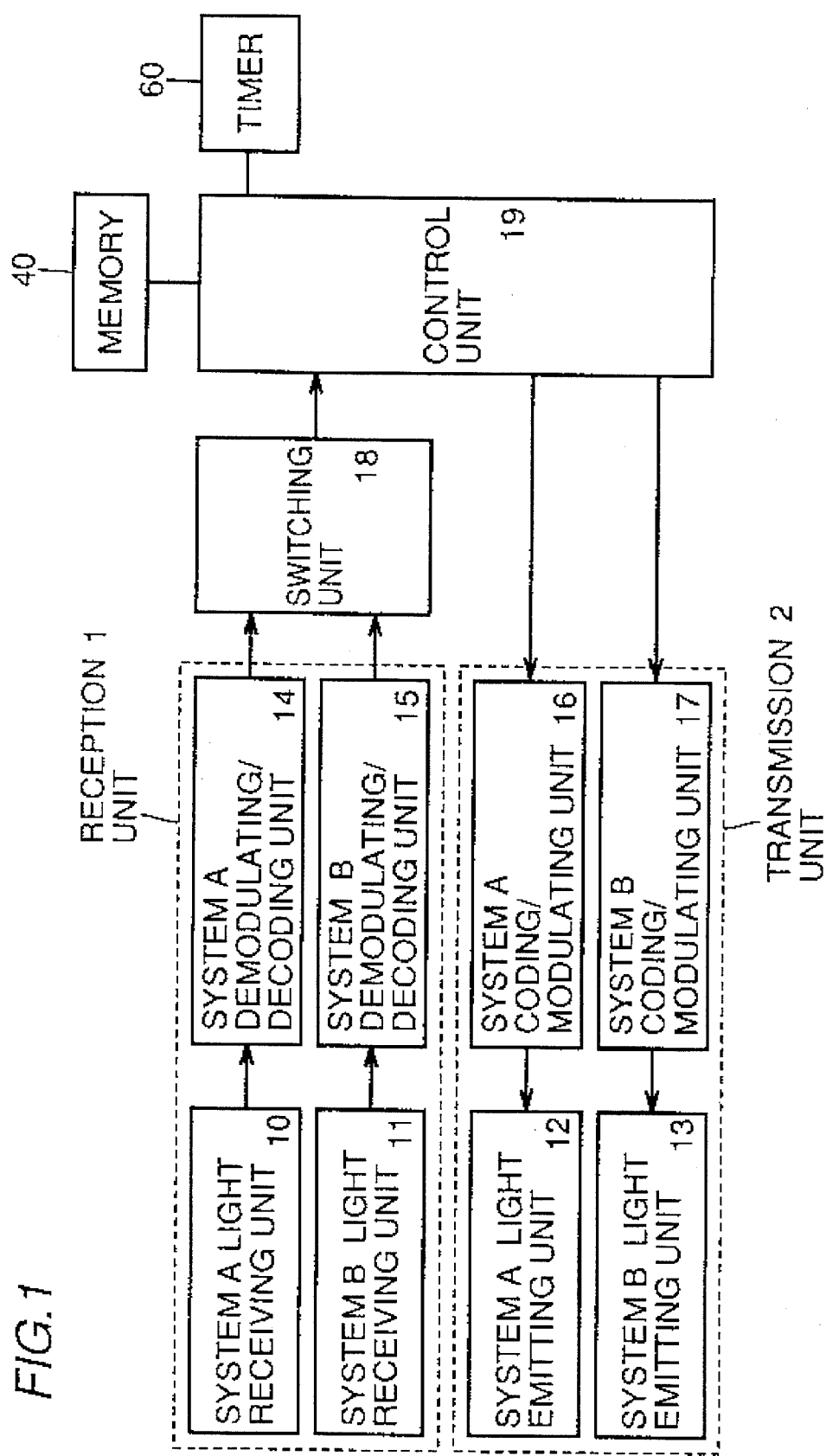
FIG. 1 shows a structure of a communication apparatus of the present invention.
Figure 2:
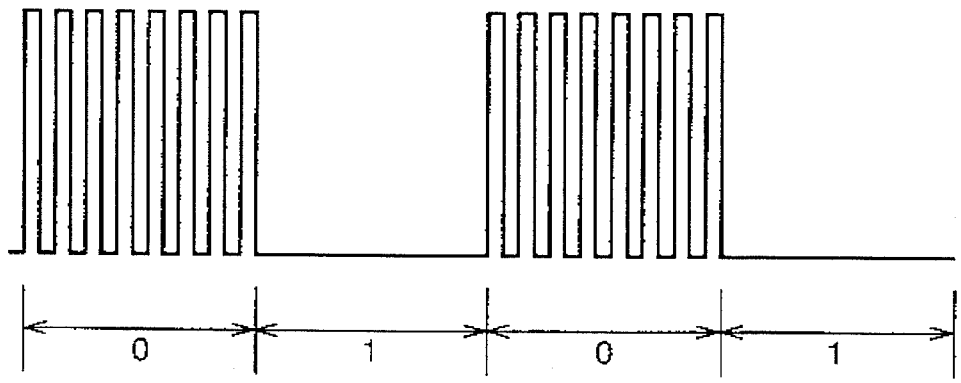
FIG. 2 shows the modulation method of the ASK system.
Figure 3:
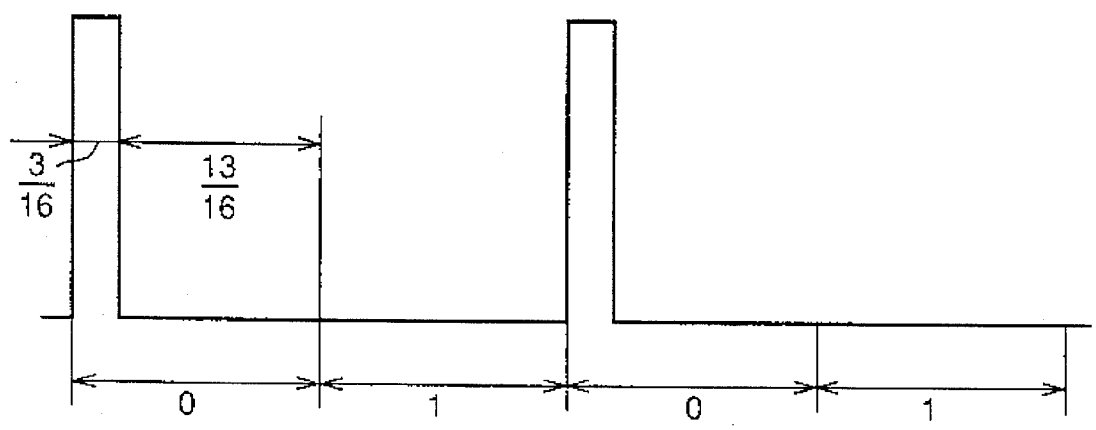
FIG. 3 shows the modulation system of the IrDA system.
Figure 4:
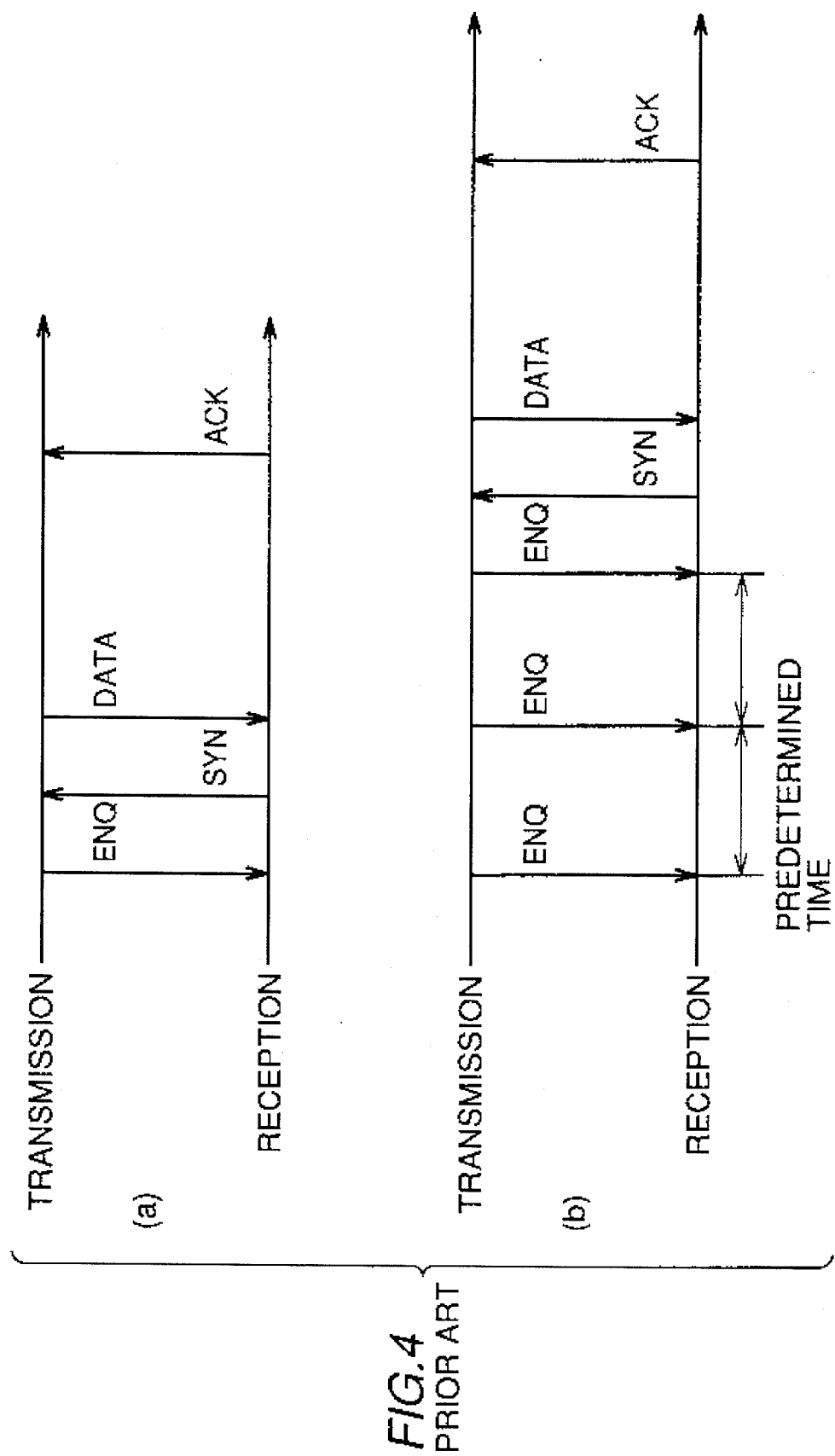
FIG. 4 is a diagram for describing the protocol of a data link layer of the ASK system.
Figure 5:
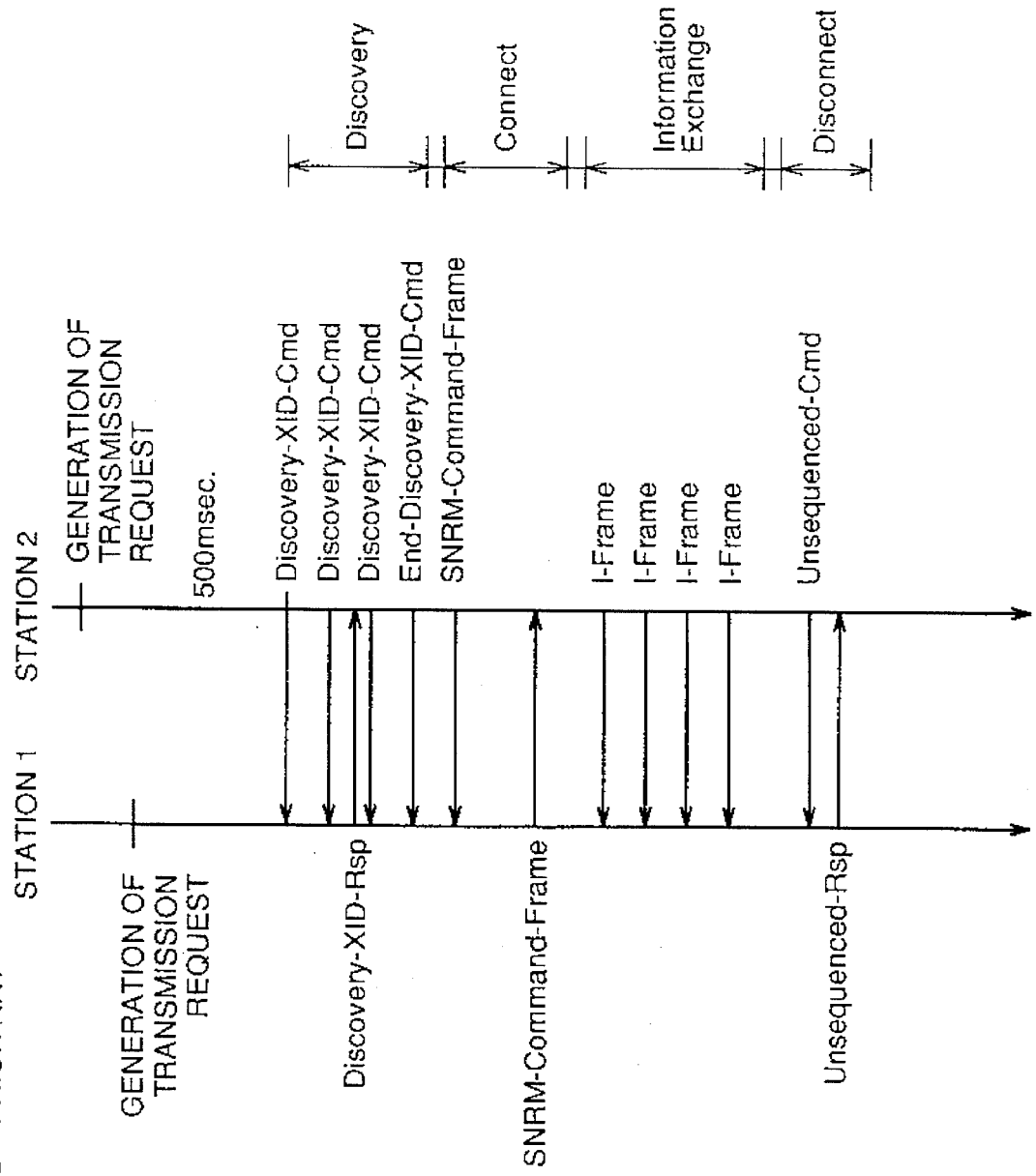
FIG. 5 is a diagram for describing the protocol of a data link layer of the IrDA system.

The basic structure and operation of the present invention will be described hereinafter schematically. Specific embodiments will be described afterwards. Referring to FIG. 1, a communication apparatus of the present invention includes a reception unit 1, a switching unit 18, a control unit 19, a transmission unit 2, a memory 40, and a timer 60. In the following embodiments, the two communication systems differing from each other are referred to as system A and system B. One example of system A is the ASK system, and one example of system B is the IrDA system.

Reception unit 1 includes a system A light receiving unit 10, a system A demodulating/decoding unit 14, a system B light receiving unit 11, and a system B demodulating/decoding unit 15. System A light receiving unit 10 has its output connected to the input of system A demodulating/decoding unit 14. System A demodulating/decoding unit 14 has its output connected to one input of switching unit 18. System B light receiving unit 11 has its output connected to the input of system B demodulating/decoding unit 15. System B demodulating/decoding unit 15 has its output connected to the other input of switching unit 18.

The output of switching unit 18 is connected to the input of control unit 19.

Transmission unit 2 includes a system A coding/modulating unit 16, a system A light emitting unit 12, a system B coding/modulating unit 17, and a system B light emitting unit 13. System A coding/modulating unit 16 has its output connected to the input of system A light emitting unit 12. System A coding/modulating unit 16 has its input connected to one output of control unit 19. System B coding/modulating unit 17 has its output connected to the input of system B light emitting unit 13. System B coding/modulating system 17 has its input connected to the other output of control unit 19.

The light at light receiving unit 10 is decoded by system A demodulating/decoding unit 14. The light at system B light receiving unit 11 is decoded by system B demodulating/decoding unit 15.

By controlling switching unit 18, control unit 19 receives a packet provided from either system A demodulating/decoding unit 14 or system B demodulating/decoding unit 15. Control unit 19 analyses the applied packet and drives system A light emitting unit 12 by system A coding/modulating unit 16 and drives system B light emitting unit 13 by system B coding/modulating unit 17 according to the protocol of respective systems.

The present apparatus includes a timer 60 for measuring time, and a memory 40 such as an ROM or an electrically programmable erasable ROM storing communication process procedures, setting conditions of a flag, and control time. Control unit 19 refers to the contents of memory 40 to control timer 60, switching unit 18 switching reception unit 1, and transmission unit 2.

When the present apparatus functions as a transmitting station, the two systems A and B are switched for every predetermined time period. More specifically, the present apparatus operates for a predetermined time in system A, and then operates for a predetermined time in system B. When connection is established under one system, the apparatus is settled to that system and communication is carried out. The two systems are also switched for every predetermined time period when the present apparatus serves as a receiving station. When connection is established under one system, the present apparatus is settled to that system, and communication is carried out. In order to ensure the connection, the repetition cycle period of the transmission apparatus and the reception apparatus is selected so as not to synchronize with each other. The period of alternate operation between both systems is referred to as "alternate operation period" hereinafter.

Figure 8:
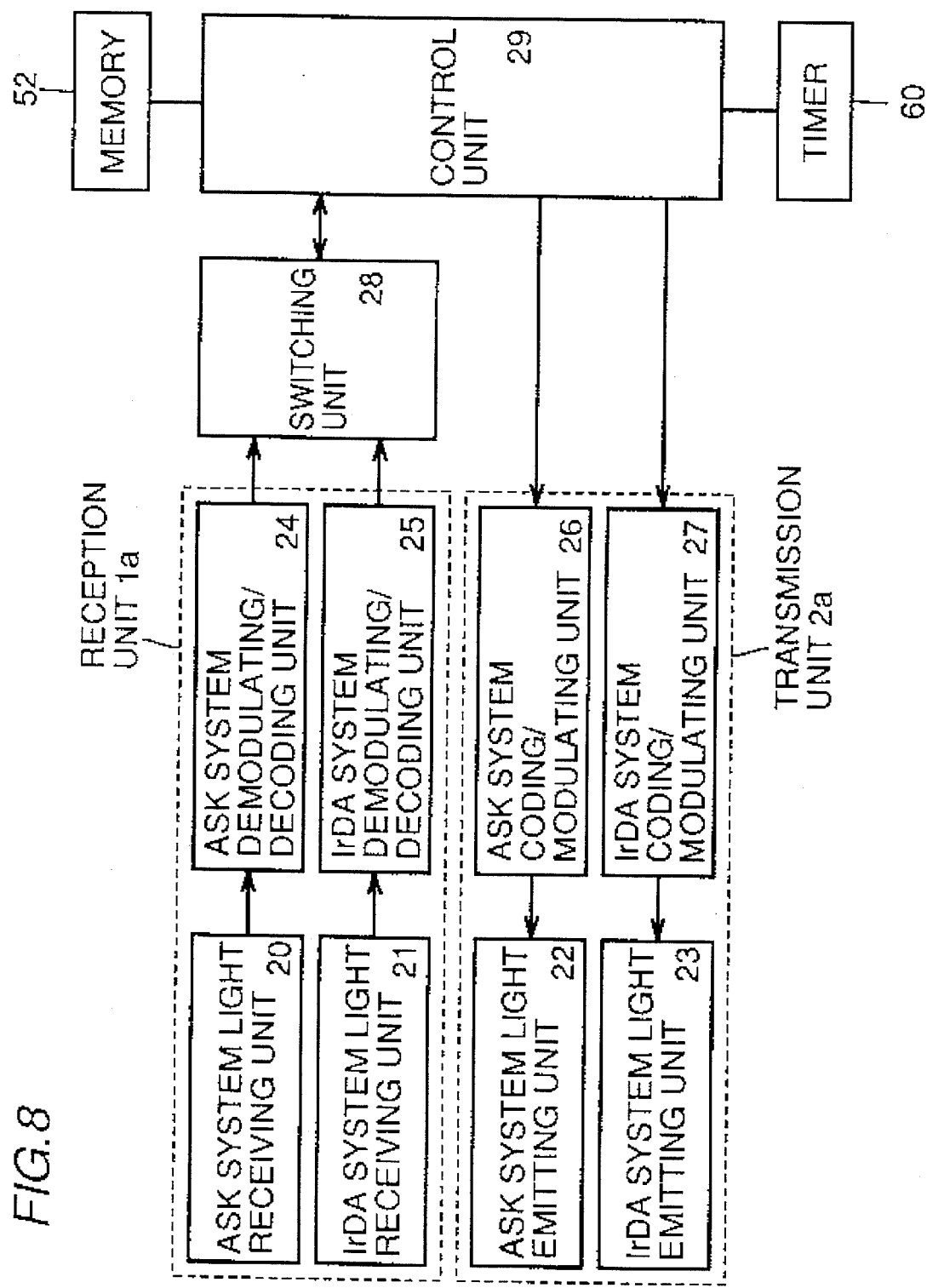
FIG. 8 shows a structure of a communication apparatus according to first, second, fifth and sixth embodiments of the present invention.

FIG. 8 shows the structure of an infrared communication apparatus with respect to the case where system A is an ASK system with its protocol, and system B is an IrDA system with its protocol.

Referring to FIG. 8, an infrared communication apparatus includes a reception unit 1a, a switching unit 28, a control unit 29, a transmission unit 2a, and a timer 60.

Reception unit 1a includes an ASK system light receiving unit 20, an ASK system demodulating/decoding unit 24, an IrDA system light receiving unit 21, and an IrDA system demodulating/decoding unit 25. ASK system light receiving unit 20 has its output connected to the input of ASK system demodulating/decoding unit 24. ASK system demodulating/decoding unit 24 has its output connected to one input of switching unit 28. IrDA system light receiving unit 21 has its output connected to the input of IrDA system demodulating/decoding unit 25. IrDA system demodulating/decoding unit 25 has its output connected to the other input of switching unit 28.

Switching unit 28 has its output connected to the input of control unit 29.

Transmission unit 2a includes an ASK system decoding/demodulating unit 26, an ASK system light emitting unit 22, an IrDA system coding/modulating unit 27, and an IrDA system light emitting unit 23. ASK system coding/modulating unit 26 has its output connected to the input of ASK system light emitting unit 22. ASK system coding/modulating unit 26 has its input connected to one output of control unit 29. IrDA system coding/modulating unit 27 has its output connected to an input of IrDA system light emitting unit 23. IrDA system coding/modulating unit 27 has its input connected to the other output of control unit 29.

System A light receiving unit 10, system A demodulating/decoding unit 14, system B light receiving unit 11, system B demodulating/decoding unit 15, switching unit 18, control unit 19, system A coding/modulating unit 16, system A light emitting unit 12, system B coding/modulating unit 17, and system B light emitting unit 13 of FIG. 1 correspond to ASK system light receiving unit 20, ASK system decoding/demodulating unit 24, IrDA system light receiving unit 21, IrDA system demodulating/decoding unit 25, switching unit 28, control unit 29, ASK system coding/modulating unit 26, ASK system light emitting unit 22, IrDA system coding/modulating unit 27, and IrDA system light emitting unit 23.

The present apparatus further includes a memory 50 corresponding to memory 40 of FIG. 1.

In an operation mode where the ASK system and the IrDA system are used alternately, subsequent communication is carried out in the ASK system when the exchange of an ENQ packet and a SYN packet is completed during operation of the ASK system, and in the IrDA system when "discovery" is completed during operation of the IrDA system. This change is carried out by controlling reception unit 1a and transmission unit 2a according to memory 50 and control unit 20. The apparatus can also be constructed to be settled to the IrDA system when Discovery and Connect are completed during operation of the IrDA system in the alternate operation period. Here, the time required for the transmission of an ENQ packet and a SYN packet in the ASK system is 300 msec. In the IrDA system, the time required to initiate Discovery is 500 msec.

Figure 7:
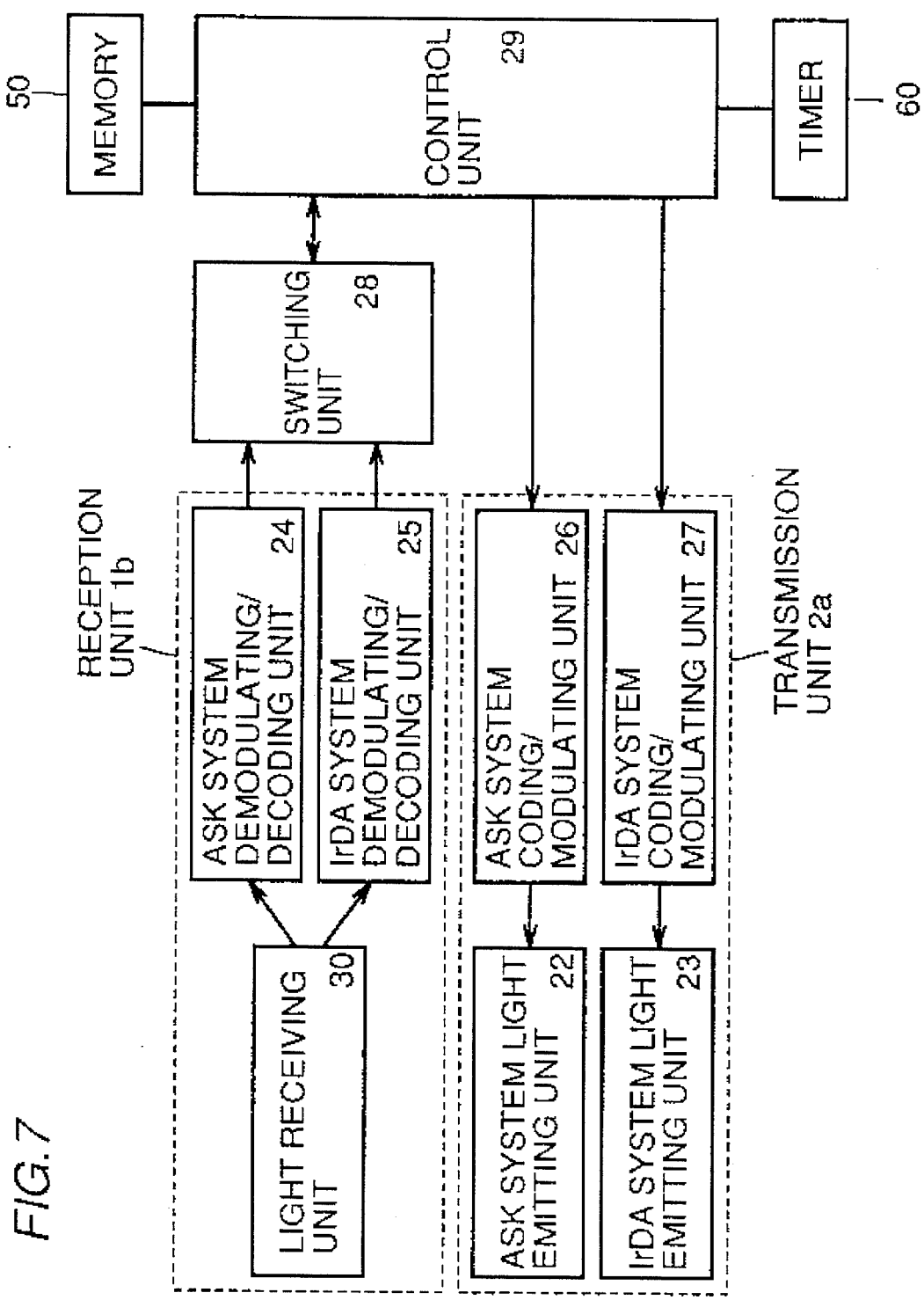
FIG. 7 shows a structure of another communication apparatus of the present invention.

FIG. 7 shows an apparatus similar to that of FIG. 8 according to another embodiment. A photodiode is generally used for the light receiving unit. Since a photodiode has a wide light receiving allowable range, ASK system light receiving unit 20 and IrDA system light receiving unit 21 of FIG. 8 can be substituted with the common light receiving unit 30 of FIG. 7. Therefore, the apparatus shown in FIG. 7 is reduced in the number of required components. In FIG. 7, reception unit 1b corresponds to reception unit 1a of FIG. 8. The other components having the same reference characters imply the same components.

In a general communication protocol, the transmitting station retransmits a packet when there is no response from the receiving station to compensate for the case where a packet is not properly received due to noise or the like. The ASK system and IrDA system respectively have retransmission protocols. The transmitting station will not receive a response when the transmitting station is an ASK system-dedicated apparatus or an IrDA-dedicated apparatus and the receiving station is an apparatus of the present invention with a reception apparatus of a system different from that of the transmitting station. According to the above-described retransmission protocol, the transmitting station will resend the packet. This time, communication will be allowed since the apparatus of the present invention operates according to a system different from that of the previous system.

A communication system is described hereinafter that allows altering the switching cycle period of the ASK system and the IrDA system of a transmission apparatus or a reception apparatus, and if possible, communicate in the IrDA system.

The data train in each of the packets of ENQ, SYN, DATA, ACK of the ASK system issued by the transmitting station is (in hexadecimal representation):

| | |
|---|---|
| ENQ | 00, 00, 00, 00, 00, 96, 82, 05 |
| SYN | 00, 00, 00, 00, 00, 96, 82, 16 |
| DATA | 00, 00, 00, 00, 00, 96, 81, 10, . . . |
| ACK | 00, 00, 00, 00, 00, 96, 82, 06 |

Each packet has five continuous 00s at the beginning.

In the communication apparatus of the present invention, automatic switching between the ASK system and the IrDA system is allowed by setting 5 bytes of 00, 01, 00, 00, 00 at the beginning of each packet, which will be described in detail later. The second byte "01" is a flag. When the receiving station is a conventional ASK apparatus, three continuous bytes of 00, 00, 96 is assumed as the beginning of a packet. Therefore, erroneous operation will not occur even when a conventional ASK apparatus receives a packet from the apparatus of the present invention. More specifically, the apparatus of the present invention is compatible with a conventional apparatus by having a flag of 01 as the second byte out of the five continuous bytes of 00 at the beginning of each packet. Furthermore, the value of this flag is not limited to 01. By setting an arbitrary value other than 00 as a flag, the present invention is realized while maintaining compatibility with a conventional apparatus. The present invention is not limited to the above-described embodiment where the second byte is used as a flag, and the first byte or the third byte may be specified as a flag.

In communication between the communication apparatuses of the present invention, the second byte of a packet is 01 differing from that of the packet of a conventional ASK apparatus when connection is to be established in the ASK system. Determination can be made that the packet is not from a conventional ASK system-dedicated apparatus by detecting the flag in the packet. Therefore, the transmission apparatus and the reception apparatus can be both settled to the advantageous IrDA system for communication.

FIRST EMBODIMENT

In the present embodiment, the transmitting station first tries to establish a connection in the ASK system, whereby the system of the receiving station is switched. FIG. 8 shows a structure of a communication apparatus of the present embodiment. Control unit 29 refers to the contents stored in memory 50, whereby the systems of reception unit 1a are alternately selected by switching unit 28. A packet according to one of the two systems can be received selectively at one time.

Figure 9:
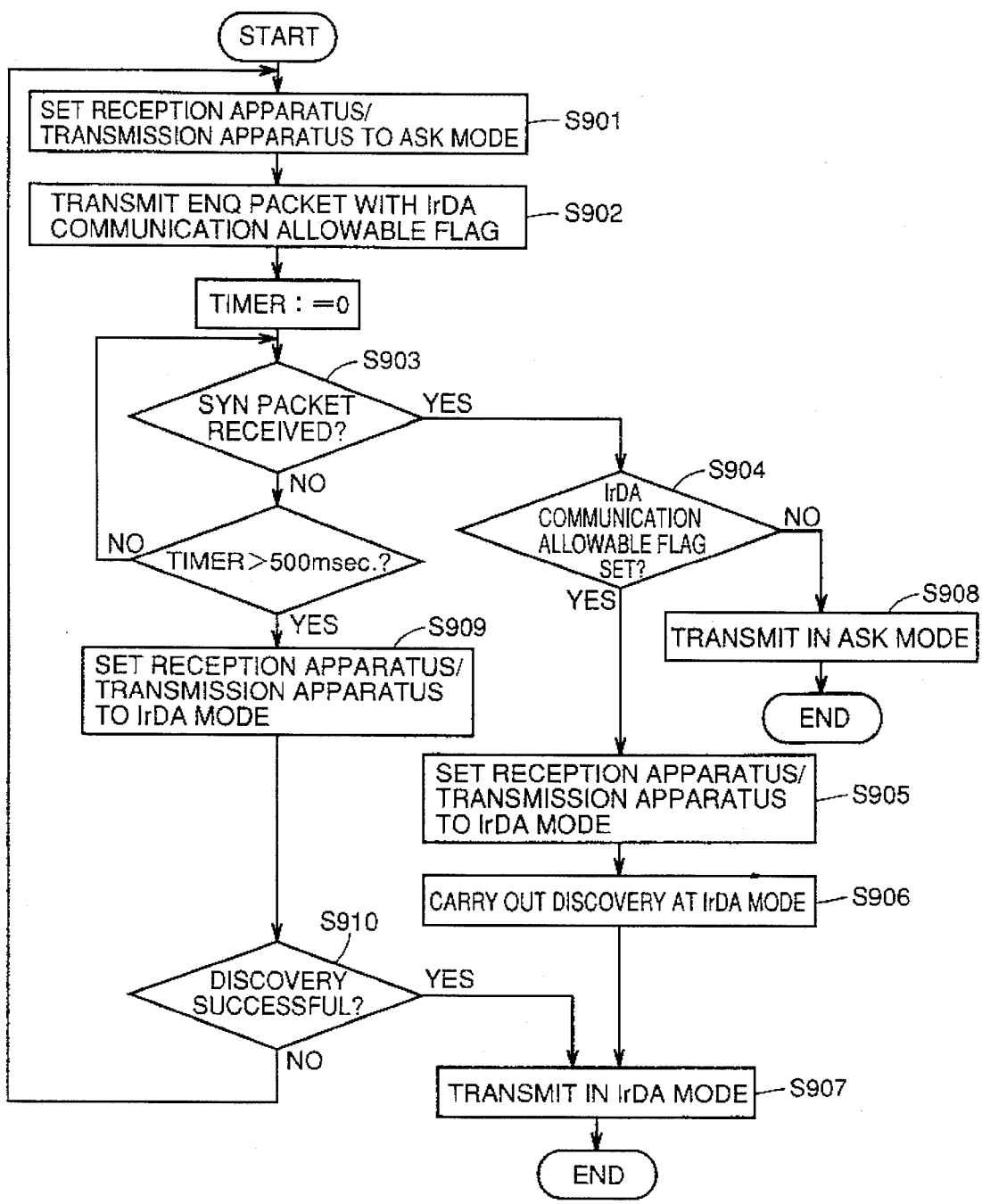
FIGS. 9 and 10 are flow charts describing the process procedure of a transmission apparatus and a reception apparatus, respectively, of the first embodiment.

FIG. 9 shows a flow chart of the process procedure of the apparatus of the transmitting station. The operation of the transmitting station will be described on the basis of this flow chart.

First, reception unit 1a and transmission unit 2a of the transmitting station are both set to the ASK mode that allows transmission and reception of the ASK system protocol according to an instruction from control unit 29 (step 901, "step" denoted as "S" hereinafter). Control unit 29 sets a flag in an ENQ packet indicating that communication is allowed in the IrDA system. This ENQ packet is transmitted (S902). The timer is reset, and determination is made by control unit 29 whether a SYN packet is received within 500 msec. after the transmission of the ENQ packet (S903). This time period of 500 msec. is exemplary, and an arbitrary time period longer than 300 msec. required for one exchange transfer of an ENQ packet and a SYN packet may be set. The control proceeds to S909 when a SYN packet is not received. When a SYN packet is received, determination is made by control unit 29 whether an IrDA system communication allowable flag is set or not in the received SYN packet at S904. When a communication allowable flag is set in the IrDA system, control unit 29 sets reception unit 1a and transmission unit 2a of the transmitting station both to the IrDA mode allowing transmission and reception of a protocol in the IrDA system (IrLAP) (S905). Thereafter, "discovery" in the IrDA mode is carried out according to the IrDA system protocol (IrLAP) (S906). When "discovery" is successful, control unit 29 transmits a packet in the IrDA mode thereafter (S907).

When an IrDA system communication allowable flag is not set at S904, the operation mode of the transmission apparatus is settled to the ASK system. A communication process according to the ASK system protocol is carried out thereafter (S908).

When a SYN packet is not received at S903, the control proceeds to S909 where reception unit 1a and transmission unit 2a of the transmitting station are both set to the IrDA mode allowing transmission and reception of the IrDA system protocol in response to an instruction from control unit 29 (S909).

When the transmission apparatus is set to the IrDA mode, the timer is reset. Control unit 29 attempts "discovery" during the elapse of 1380 msec. Determination is made of a success of "discovery" (S910). The time period of 1380 msec. is only an example, and an arbitrary time period longer than the time of 500 msec. that is required to monitor initially in the IrDA mode can be set. This time period is selected for the purpose of "discovery" in the IrDA system.

When "discovery" succeeds within the 1380 msec., the operation mode of the transmission apparatus is settled to the IrDA mode for a transmission process (S907). When the timer of 1380 msec. expires and "discovery" is not successful, the control returns to S901. This repetition is carried out to the maximum of 240 times in the present embodiment. If "discovery" is not yet successful, the user is notified of communication disable. It is apparent to those skilled in the art that the present invention is not limited to the number of 240 times.

Thus, the apparatus of the transmitting station repeats a cycle period of 1880 msec. until the communication system is settled in which the ASK system and the IrDA system are alternately selected and operated for 500 msec. and 1380 msec., respectively.

Figure 10:
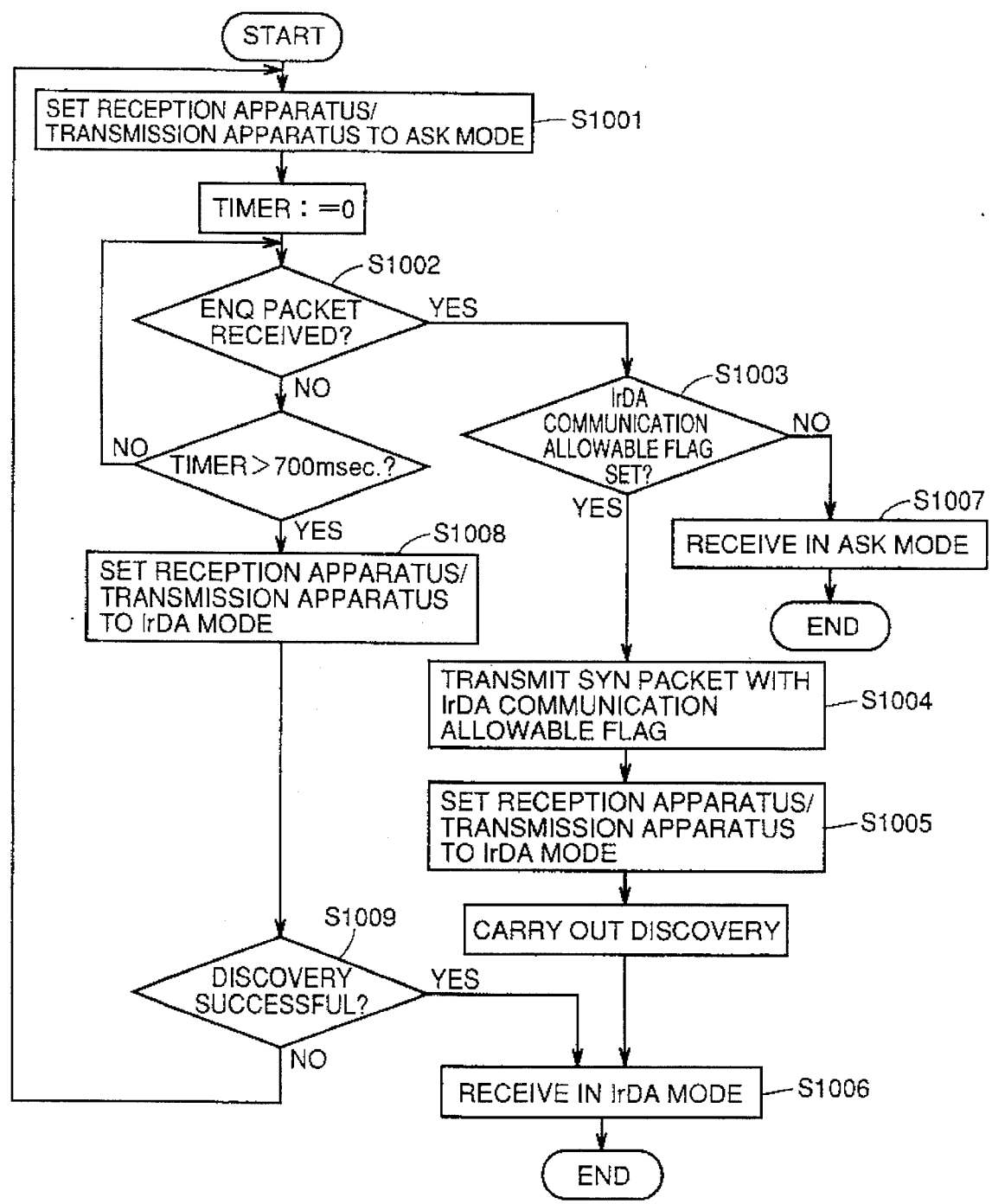

FIG. 10 is flow chart of the process procedure of a receiving station. The operation of the apparatus of the receiving station will be described with reference to this flow chart.

First, reception unit 1a and transmission unit 2a of the receiving station are set to the ASK mode by an instruction of control unit 29 (S1001). Timer 60 is reset to count 700 msec. Control unit 29 refers to the contents of memory 50 to determine whether an ENQ packet is received or not within the 700 msec. (S1002). This time period of 700 msec. is only an example, and an arbitrary time period may be set as long as it is greater than the time required for the exchange of one ENQ packet and one SYN packet. The control proceeds to S1008 when an ENQ packet is not received.

When an ENQ packet is received, control unit 29 refers to the contents of memory 50 to determine whether an IrDA system communication allowable flag is set in the received ENQ packet (1003). When an IrDA system communication allowable flag is set, a flag indicating that communication in the IrDA system is allowed is set in a SYN packet. This SYN packet is transmitted within 300 msec. (S1004). Transmission unit 2a and reception unit 1a of the receiving station are both switched to the IrDA mode (S1005), and "discovery" is carried out. As a result, a connection is established, and a reception process under the IrDA mode is carried out thereafter (S1006).

When an IrDA system communication allowable flag is not set in the ENQ packet, reception unit 1a and transmission unit 2a of the receiving station are settled to the ASK mode by an instruction of control unit 29. A reception process under the ASK mode is carried out thereafter (S1007).

When an ENQ packet is not received within 700 msec., the control proceeds to S1008 where reception unit 1a and transmission unit 2a of the receiving station are both set to the IrDA mode.

In the IrDA mode, "discovery" is attempted for 1200 msec. (S1009). This time period of 1200 msec. is only an example, and an arbitrary time may be set as long as it is greater than 500 msec. required as the time period from the start of transmission to "discovery".

When determination is made that "discovery" is successful within the 1200 msec. at S1009, the reception apparatus is settled to the IrDA mode to carry out a reception process according to the IrLAP protocol thereafter (S1006).

When the time of 1200 msec. elapses at S1009, the control returns to S1001. The above-described process is repeated thereafter. This repetition is carried out to the maximum of 150 times. When "discovery" is not yet successful, the user is notified of communication error. It is to be noted that the number of 150 times does not limit the contents of the present invention.

Thus, the apparatus of the receiving station operates at a cycle period of 1900 msec. until a connection is established in which the apparatus alternately operates under the ASK system and the IrDA system for 700 msec. and 1200 msec., respectively.

Figure 19:
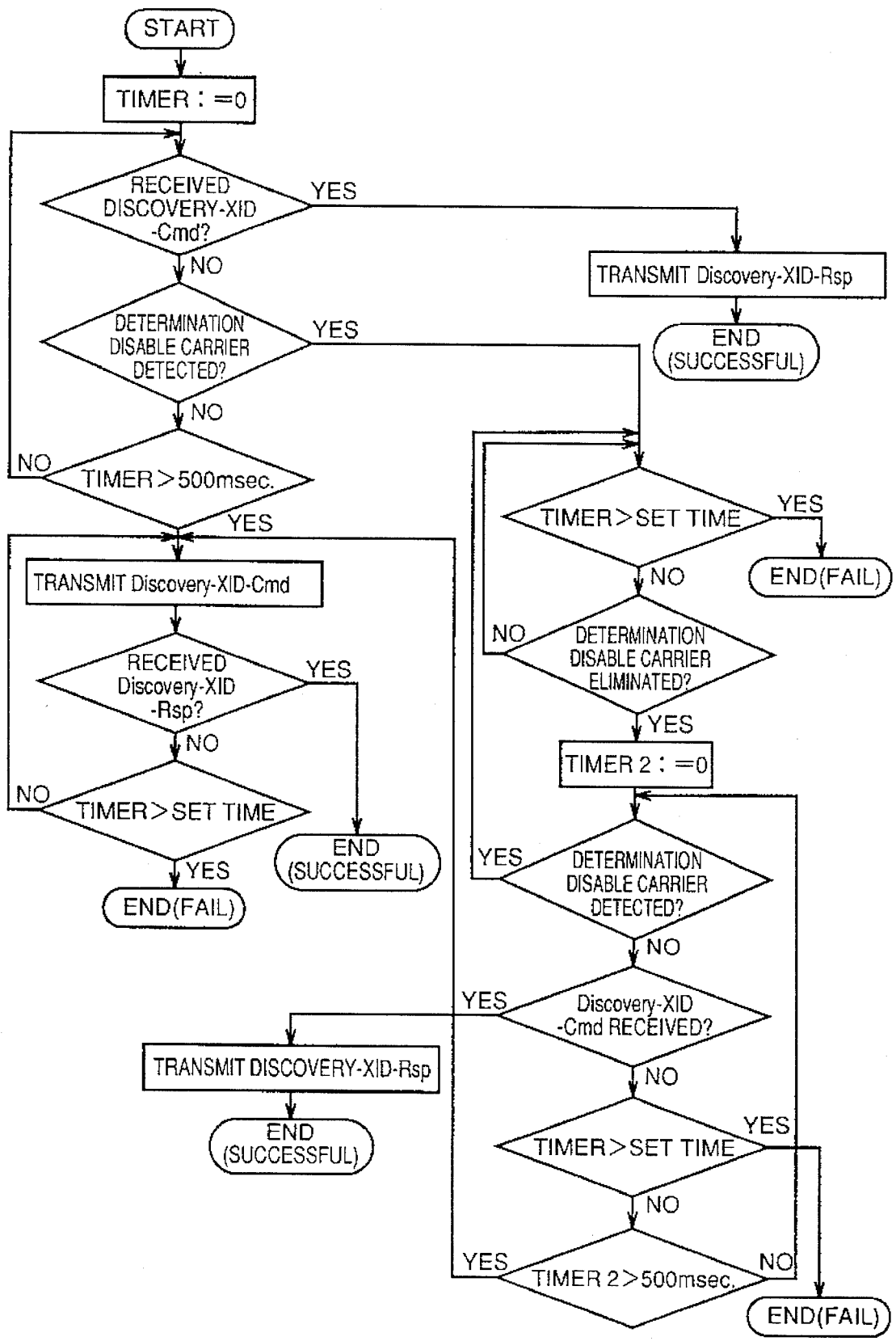
FIG. 19 is a detailed flow chart of the process of determining whether "discovery" is successful within a predetermined time period.
Figure 20:
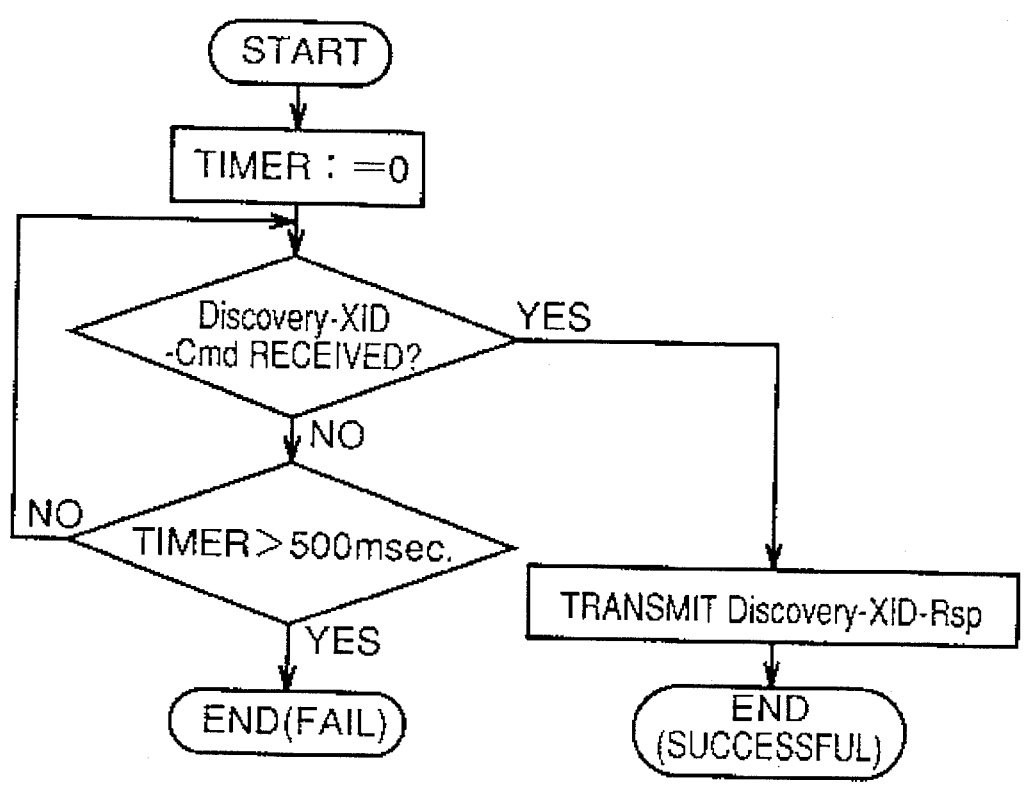
FIG. 20 is a detailed flow chart for determining whether "discovery" is successful within a predetermined time period in the flow chart of each embodiments.

FIGS. 19 and 20 are flow charts of the process procedure of carrying out "discovery" subsequent to the Steps of S905, S909, S1005, and S1008 within a predetermined time after switching to the IrDA mode in the above-described apparatus of the transmitting station or the receiving station. It is to be noted that the other embodiments described afterwards can carry out the procedure of "discovery" according to the present flow chart.

FIG. 19 shows the control in the case where the apparatus of the present embodiment positively transmits a Discovery- XID-Cmd packet to attempt "discovery". A second timer 2 of two timers provided is used to measure the time of 500 msec. during which the media should not be used from initiation of communication to transmission of a packet in the IrDA system. This is due to a regulation in IrLAP that a packet must not be transmitted unless vacancy of the media is confirmed at the preceding 500 msec. It is to be noted that the "set time" to be counted by the second timer in FIG. 19 must be greater than 500 msec.

FIG. 20 shows the procedure of realizing a simple "discovery" process in which waiting is conducted for the reception of a Discovery-XID-Cmd packet and returning a Discovery-XID-Rsp packet upon reception within the predetermined time.

The contents of FIGS. 19 and 20 are straightforward and those skilled in the art will be able to understand the contents thereof. Therefore, detailed description will not be provided here.

For example, the procedures of FIG. 19 and FIG. 20 can be followed when the apparatuses operate as the transmitting station and the receiving station, respectively. Alternatively, an apparatus operating as a transmitting station and an apparatus operating as a receiving station can both follow the procedure of FIG. 19. Furthermore, the procedures of FIGS. 20 and FIG. 19 may be followed when the apparatuses operate as a transmitting station and a receiving station, respectively. It is to be noted that "discovery" is not successful when an apparatus operating as the transmitting station and an apparatus operating as the receiving station both follow the procedure of FIG. 20 since both apparatuses of the receiving and sending stations await for reception of a packet.

The time chart of establishing a connection will be described hereinafter according to the present embodiment.

Figure 16:
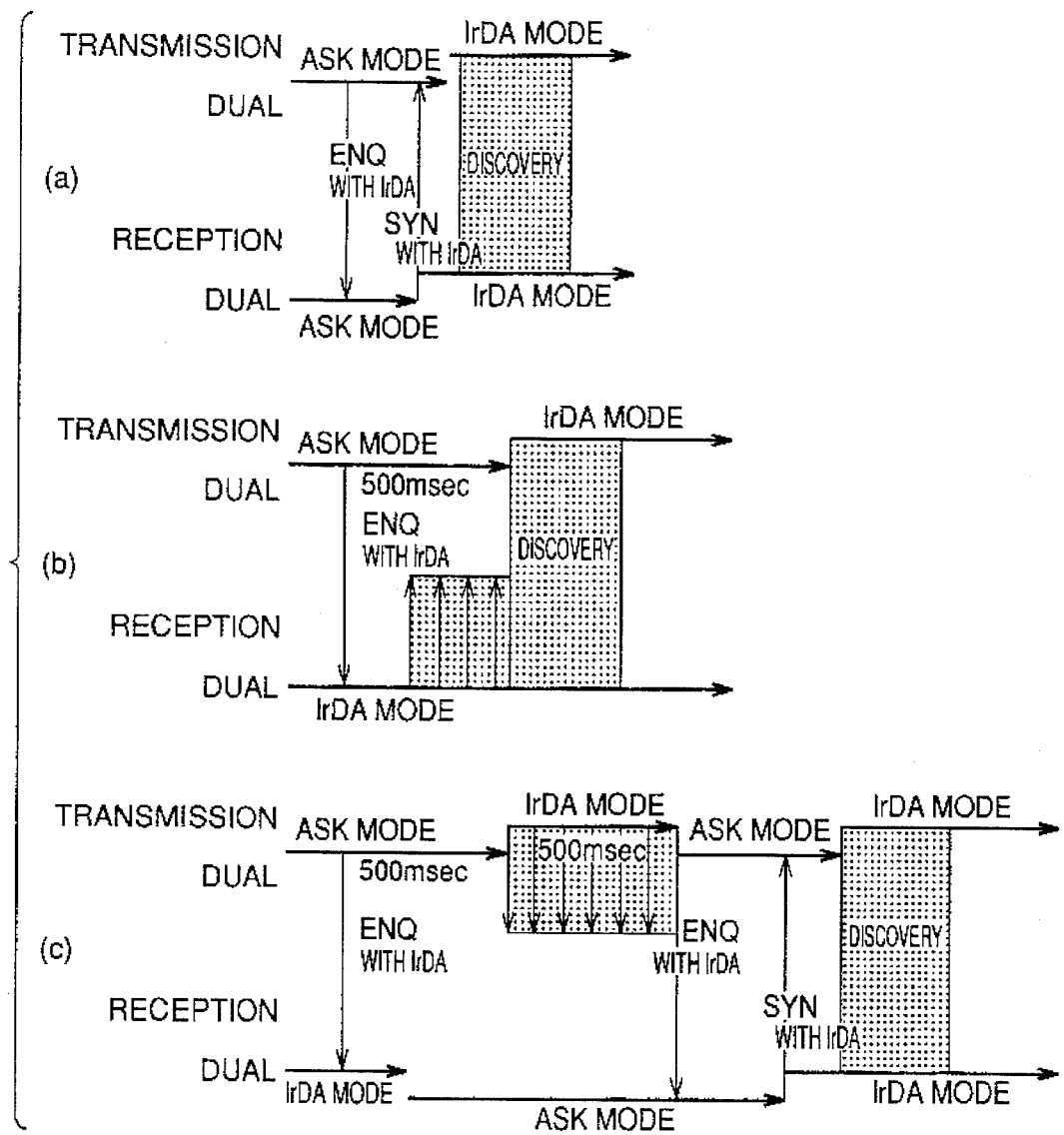
FIG. 16 is a timing chart of communication when the transmitting station and the receiving station are communication apparatuses of the present invention that allows both transmission and reception according to the first embodiment.

FIG. 16 is a time chart showing the case where the transmitting station is a dual transmission/reception allowable apparatus of the present invention and the receiving station is also the dual transmission/reception allowable apparatus of the present invention. In FIG. 16, (a) shows the case where both the transmitting and receiving stations are in the ASK mode, and (b) and (c) show the case where the receiving station is in the IrDA mode. Referring to FIG. 16(b), the receiving station attempts transmission in the IrDA mode. FIG. 16(c) shows the case where the receiving station is switched to the ASK mode within 500 msec. after transmission of an ENQ packet from the transmitting station.

The IrLAP does not specify the procedure of the transmitting station transmitting a Discovery-XID-Cmd packet and the receiving station returning a Discovery-XID-Rsp packet. According to the protocol of the IrDA mode, the station that failed to transmit a Discovery-XID-Cmd packet transmits a Discovery-XID-Rsp packet to the station that transmits a Discovery-XID-Cmd packet previously. Since the direction of the packet transmitted is indefinite during this procedure, this portion is hatched in the drawing. The plurality of arrows in the hatched region indicates that the plurality of transmitted Discovery-XID-Cmd packets are not properly received since the station of the other party is set to a reception mode of the ASK system. The portion indicated "with IrDA" at the transmission and reception of a packet indicates that the aforementioned flag is included in the packet. The plurality of arrows, hatching portions, and flag portions in the following drawings are used in a manner similar to those of FIG. 16.

SECOND EMBODIMENT

In a second embodiment of the present invention, the transmitting station first tries to establish a connection under the IrDA system, whereby the receiving station switches the operation mode to the IrDA system. Although the transmitting side and the receiving side in the second embodiment are opposite to those of the first embodiment, the structure of the communication apparatus is similar to that of the first embodiment. The difference from the first embodiment can be realized by altering the stored contents of the procedure in control unit 29.

Figure 11:
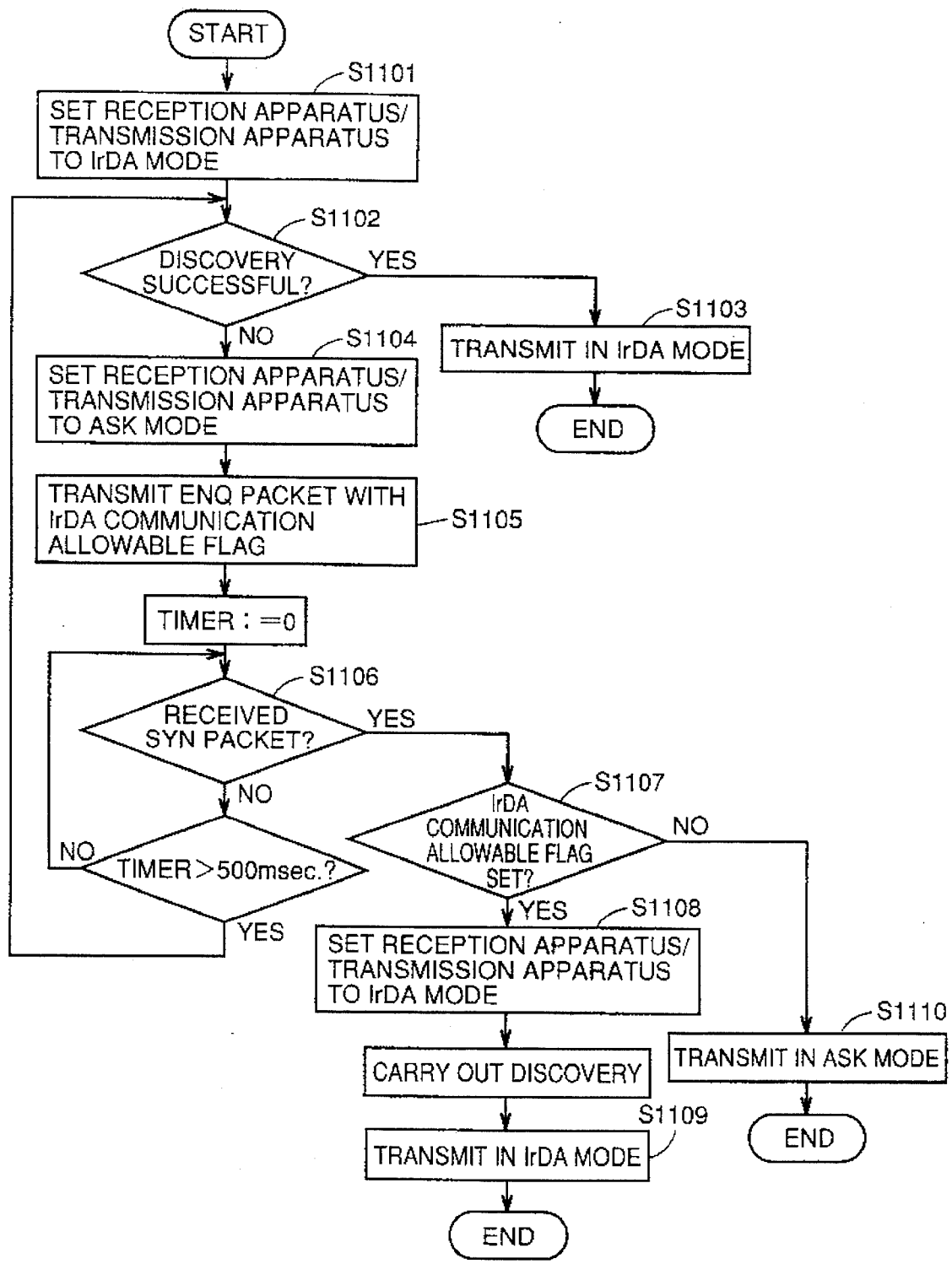
FIGS. 11 and 12 are flow charts for describing the processing procedures of the transmission apparatus and the reception apparatus, respectively, of the second embodiment.

FIG. 11 is a flow chart of the procedure of the transmitting station.

First, reception unit 1a and transmission unit 2a of the transmitting station are both set to the IrDA system by an instruction of control unit 29 (S1101). "Discovery" is attempted for 1380 msec. in the IrDA system, and control unit 29 determines whether "discovery" is successful or not (S1102). When "discovery" succeeds during the 1380 msec., the system is settled to the IrDA mode to carry out a transmission process according to the IrLAP protocol thereafter (S1103).

When the time of 1380 msec. expires at S1102, reception unit 1a and transmission unit 2a of the transmitting station are both set to the ASK mode by an instruction of control unit 29 (S1104). Control unit 29 sets a flag indicating that communication in the IrDA system is allowed in an ENQ packet, and transmits that packet (S1105). The timer is reset to measure 500 msec. Control unit 29 determines whether a SYN packet is received or not within this 500 msec. after transmission of an ENQ packet (S1106). When a SYN packet is not received, the control returns to S1101, and the above-described process is repeated. This repetition is carried out to the maximum of 240 times. Control unit 29 determines whether an IrDA system communication allowable flag is set in the received SYN packet (S1107). When an IrDA communication allowable flag is set, reception unit 1a and transmission unit 2a of the transmitting station are set to the IrDA mode (S1108), and "discovery" is carried out. A transmission process according to the IrLAP protocol is carried out (S1109).

When an IrDA mode communication allowable flag is not set, transmission unit 2a is set to the ASK mode, and a transmission process according to the ASK system protocol is carried out (S1110).

Figure 12:
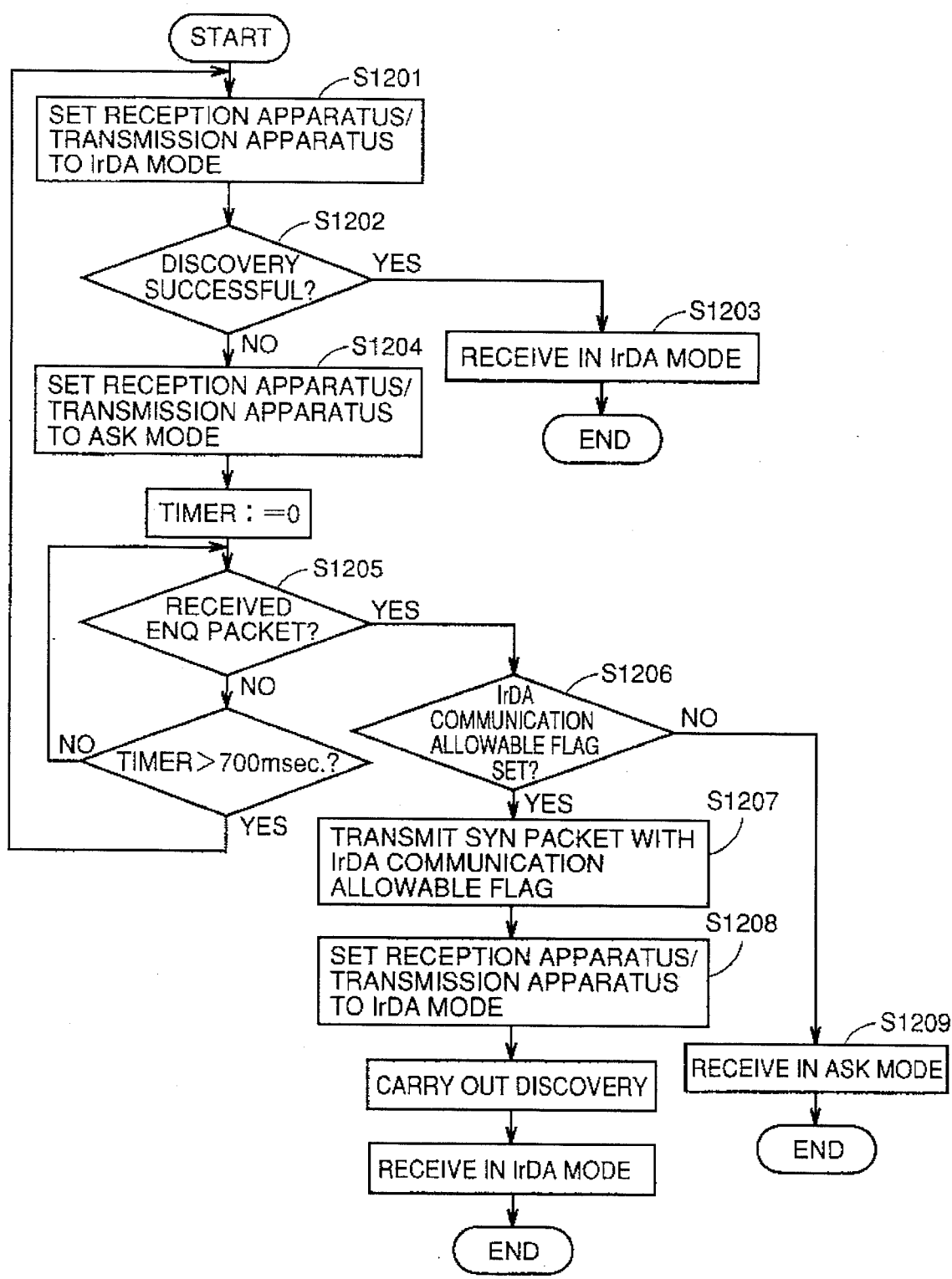

The procedure of the reception apparatus may be set similar to that of the first embodiment. However, the procedure of the transmitting apparatus as shown in FIG. 12 is preferable to reduce the average connection time.

First, reception unit 1a and transmission unit 2a of the reception apparatus are set to the IrDA mode by an instruction of control unit 29 (S1201). "Discovery" in the IrDA mode is attempted during 1200 msec. (S1202). When a connection is established during the 1200 msec., the system is settled to the IrDA mode, and a reception process according to the IrLAP protocol is carried out (S1203).

When the time of 1200 msec. expires at S1202, reception unit 1a and transmission unit 2a of the receiving apparatus are set to the ASK mode by an instruction of control unit 29 (S1204). The timer is reset for a period of 700 msec. Control unit 29 determines whether an ENQ packet is received during the 700 msec. (S1205). When an ENQ packet is not received within the 700 msec., the control proceeds to S1201. This process is repeated thereafter up to the maximum limit of 150 times.

Determination is made whether an IrDA mode communication allowable flag is set in the received ENQ packet (S1206). When an IrDA mode communication allowable flag is set, a flag indicating that communication in the IrDA system is allowed is set in a SYN packet. This SYN packet is transmitted within 300 msec. (S1207). Reception unit 1a and transmission unit 2a are both switched to the IrDA mode (S1208), and "discovery" is carried out. A reception process according to the IrLAP protocol is carried out.

When determination is made that an IrDA communication allowable flag is not set at S1206, the operation mode of the transmission and receiving apparatuses are settled to the ASK mode. A reception process according to the ASK mode is carried out (S1209).

In the present embodiment, the discovery step subsequent to S1102, S1108, and S1202, S1208 can be carried out according to the procedures shown in FIG. 19 for the transmitting station and FIG. 20 for the receiving station, for example.

A time chart prior to the establishment of a communication system of the present embodiment will be described hereinafter.

Figure 17:
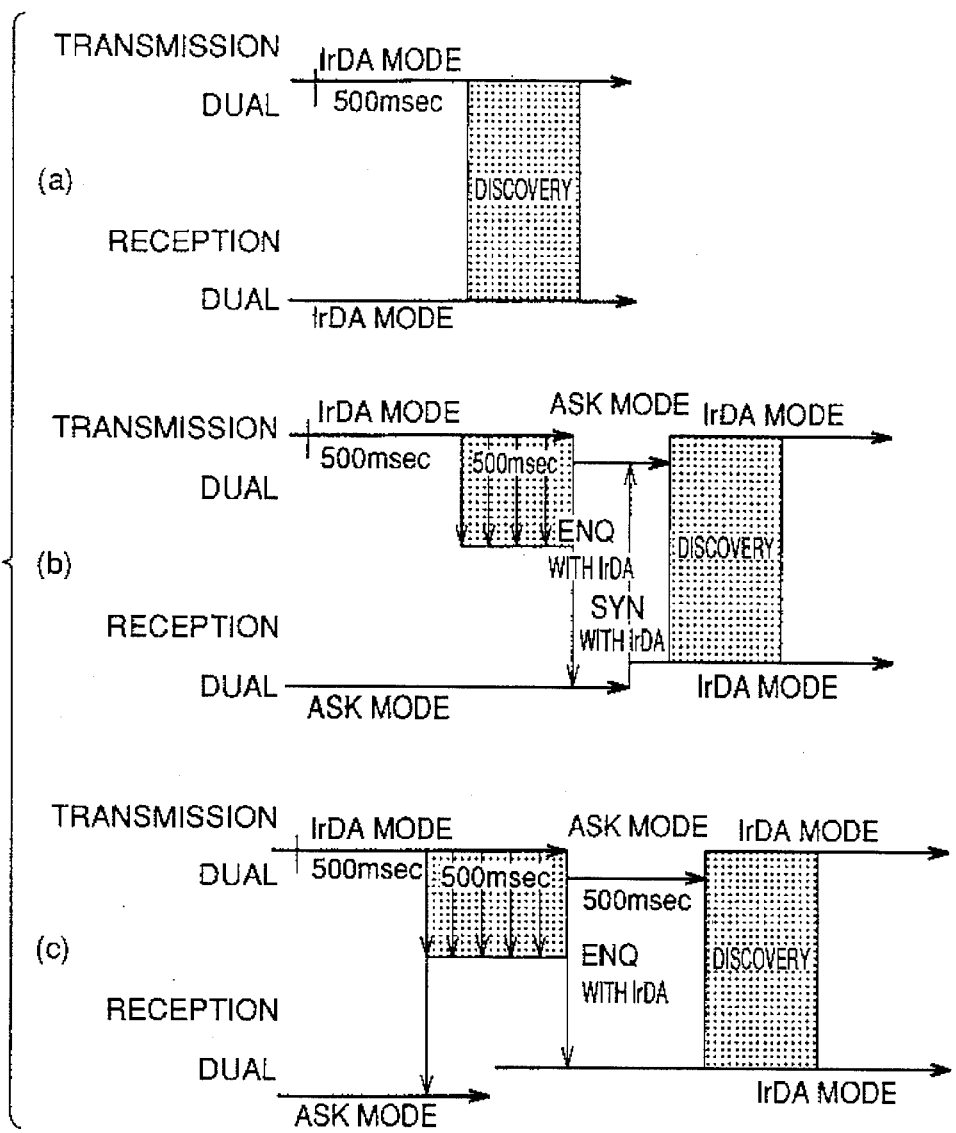
FIG. 17 is a timing chart of communication when the transmitting station and the receiving station are the communication apparatuses of the present invention allowing both transmission and reception according to the second embodiment.

FIG. 17 is a time chart showing the case where the transmitting station is a communication apparatus of the present invention capable of both transmission and reception, and the receiving station is also the communication apparatus of the present invention that allows both transmission and reception. In FIG. 17, (a) shows the case where the receiving station attains the IrDA mode, and (b) and (c) shows the case where the receiving station attains the ASK mode. Referring to FIG. 17(b), the transmitting station attempts a transmission in the IrDA mode, and the time period of 1380 msec. elapses at the receiving station while in the ASK mode. Referring to FIG. 17(c), the receiving station is switched from the ASK mode to the IrDA mode while the transmitting station is transmitting at the IrDA mode.

THIRD EMBODIMENT

Figure 6:
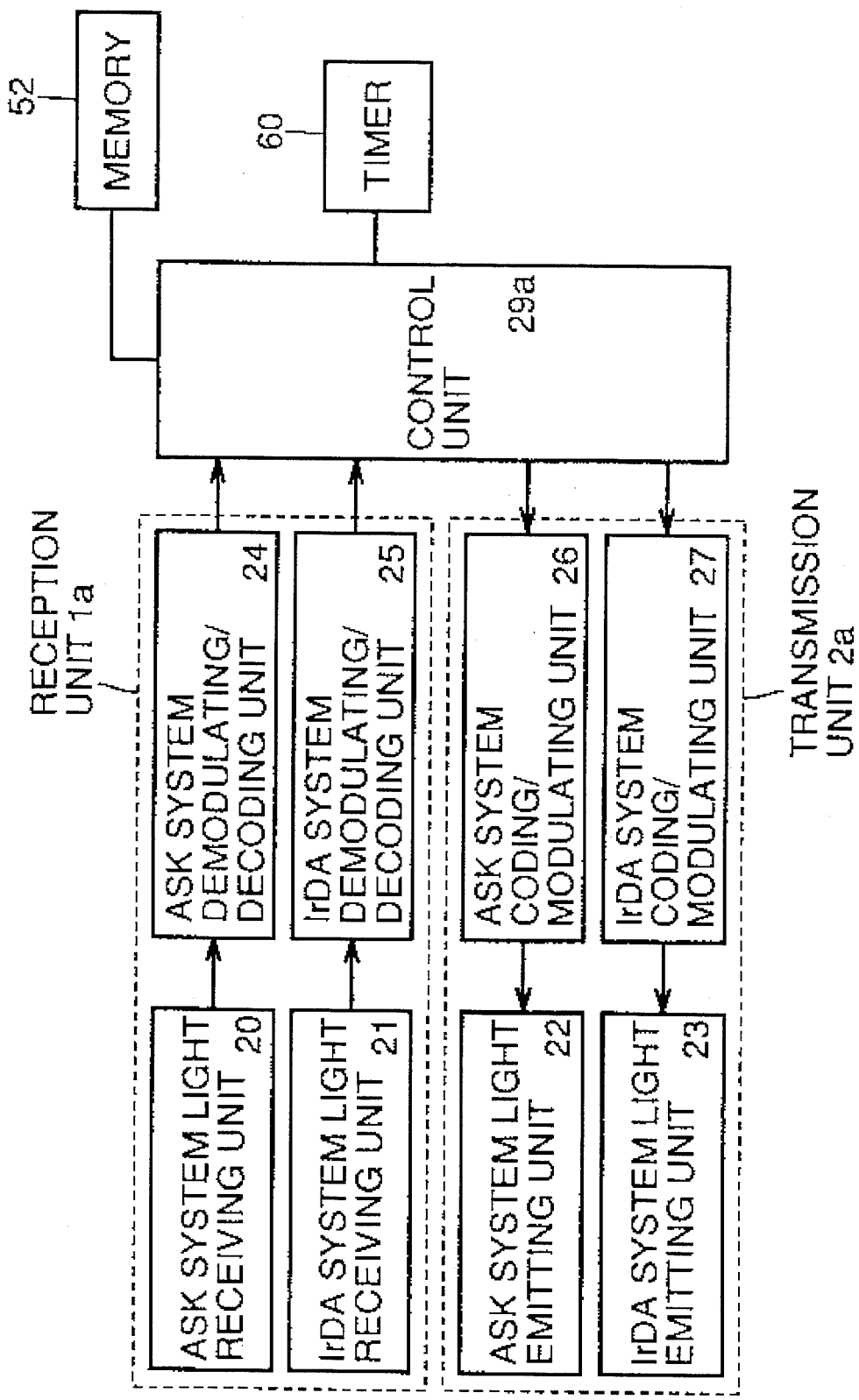
FIG. 6 shows a structure of a communication apparatus according to third and fourth embodiments.

The present embodiment shows an apparatus where the transmitting station first attempts to establish a connection in the ASK system, and the receiving station allows simultaneous reception of the ASK system and the IrDA system. FIG. 6 shows a structure of the communication apparatus of the present embodiment.

Referring to FIG. 6, an infrared communication apparatus includes a reception unit 1a, a control unit 29a, a transmission unit 2a and a timer 60.

Reception unit 1 and transmission unit 2a are similar to those shown in FIG. 8. Therefore, the details thereof will not be repeated here. The apparatus of FIG. 6 differs from the apparatus of FIG. 8 in that a control unit 29a that receives an output of reception unit 1a that can accommodate both of two systems is provided instead of control unit 29 of FIG. 8, and that switching unit 28 is removed.

The apparatus further includes a memory 52 corresponding to memory 50 of FIG. 8.

The apparatus of the present embodiment is disadvantageous in that the hardware is increased since control unit 29a must allow simultaneous reception according to two systems. However, switching unit 28 is not required, and switching of the operation mode is not needed in contrast to the first embodiment. Therefore, the time required for connection is shorter than that of the first embodiment.

The difference from the first embodiment can be realized by setting the stored contents of memory 52 connected to control unit 29a different from that of memory 50 of FIG. 8.

The procedure of the transmitting station is similar to that of the first embodiment, and their description will not be repeated here.

Figure 13:
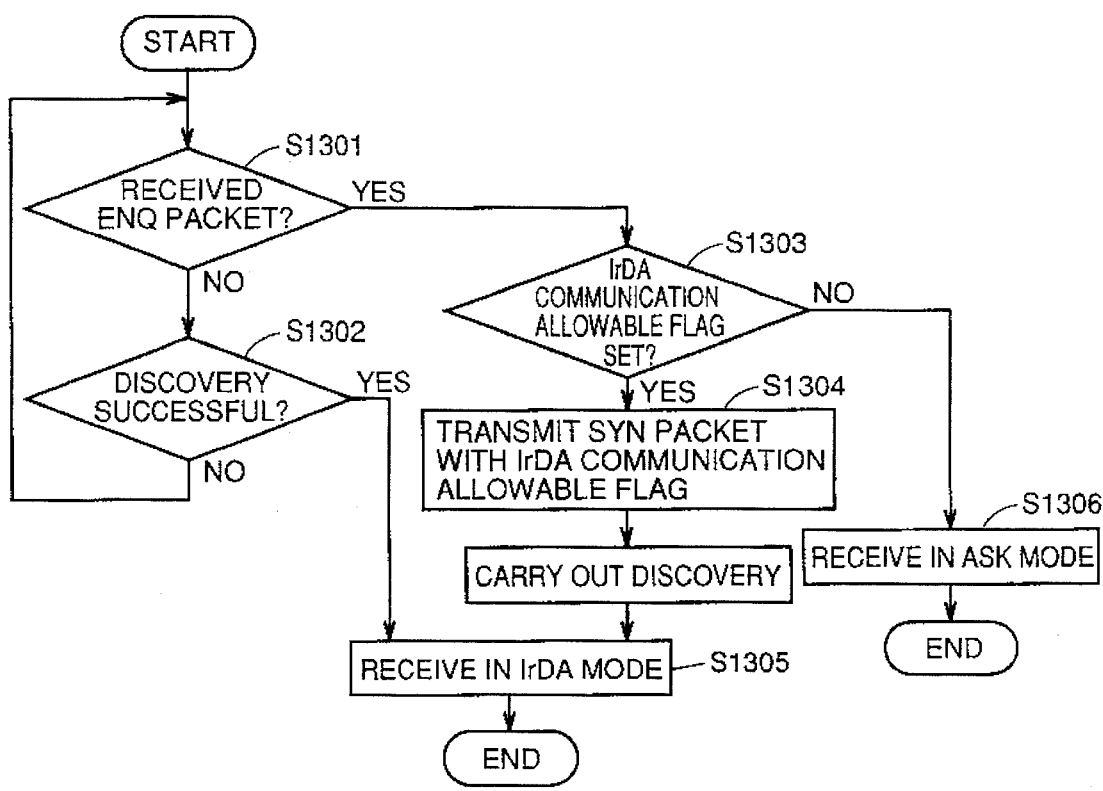
FIG. 13 is a flow chart for describing the process procedure of the reception apparatus of the third embodiment.

FIG. 13 shows a flow chart of the procedure of the receiving station according to the present embodiment.

First, the media is monitored, and control unit 29 determines whether an ENQ packet is received or not (S1301). When an ENQ packet is received, the control proceeds to S1303. When an ENQ packet is not received, the control proceeds to S1302. At S1302, control unit 29 determines whether an XID packet is received or not, i.e. whether "discovery" is successful or not. When reception is detected, the control proceeds to S1305 to carry out reception in the IrDA mode.

When determination is made of a reception of an ENQ packet at 1301, determination is made whether an IrDA communication allowable flag is set in the received ENQ packet (S1303).

When the IrDA communication allowable flag is set, a flag indicating that communication in IrDA is possible is set in a SYN packet which is sent within the 300 msec. required for returning a SYN packet after receiving an ENQ packet (S1304). A reception process according to the IrLAP protocol is carried out thereafter (S1305).

When an IrDA communication allowable flag is not set, a reception process according to the ASK mode protocol is carried out (S1306).

The "discover" procedure of S1302 can be effected by the procedure shown in FIG. 20.

In the present embodiment, the time chart of establishing a connection is similar to those of the first or second embodiments. Therefore, the details will not be repeated here.

FOURTH EMBODIMENT

In the present embodiment, the transmitting station first attempts connection in the IrDA system, and the receiving station allows simultaneous reception of the ASK system and the IrDA system. The structure of the apparatus and the procedure of the receiving station of the present embodiment are similar to those of the third embodiment. The procedure of the transmitting apparatus is similar to that of the second embodiment. Therefore, the details will not be repeated here.

In the present embodiment, the time chart of establishing a connection is similar to that of the first and second embodiments.

FIFTH EMBODIMENT

The present embodiment corresponds to the case where the reception range of the IrDA system is smaller than the reception range of the ASK system. There may be the case where the transmitting station fails to establish the IrDA system due to its insufficient communication distance, and the receiving station switches between the ASK system and the IrDA system. It is to be noted that a connection can be established reliably in the IrDA system in an opposite case.

The structure of the communication apparatus of the embodiment is similar to those of the first and second embodiments. The difference in the procedure corresponds to modification of the stored contents.

Figure 14:
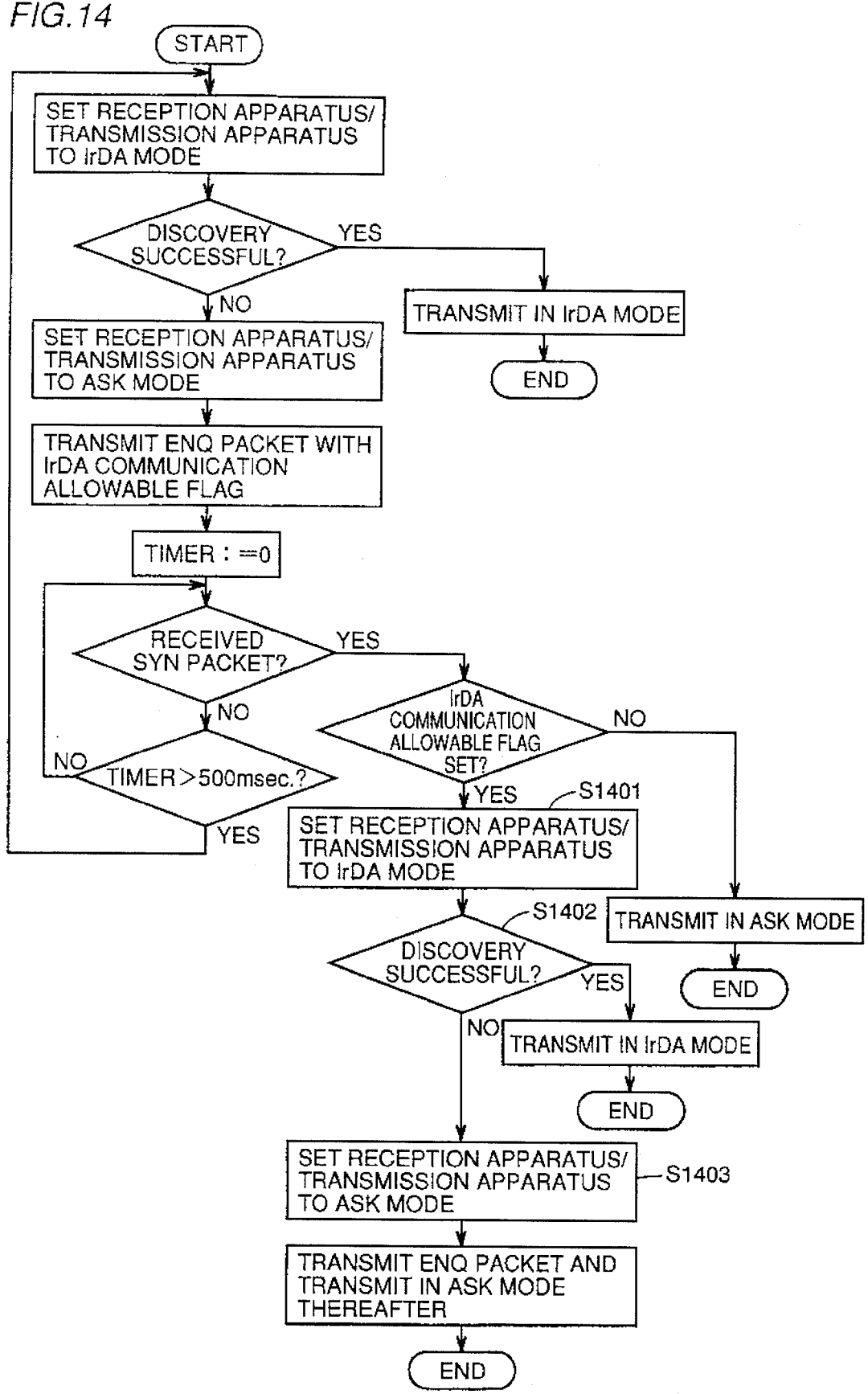
FIGS. 14 and 15 are flow charts for describing the process procedures of the transmission apparatus and the reception apparatus, respectively, of the fifth embodiment.

FIG. 14 is a flow chart of the procedure of the transmitting station. The flow chart of FIG. 14 is similar to the flow chart of FIG. 11 of the second embodiment, provided that a process step is added succeeding S1108 (S1401 of FIG. 14) for setting the operation mode to the ASK mode after failing in "discovery".

When the flag is set to a communication allowing the IrDA mode, control unit 29 sets reception unit 1a and transmission unit 2a of the transmitting station to the IrDA mode (S1401), and "discovery" is attempted for 1500 msec. (S1402). When "discovery" is successful, the operation of the apparatus is settled to the IrDA mode, and a transmission process according to the IrLAP protocol is carried out. If "discovery" fails, reception unit 1a and transmission unit 2a of the transmitting station are both set to the ASK mode, and a transmission process according to the ASK protocol is carried out (S1403).

Figure 15:
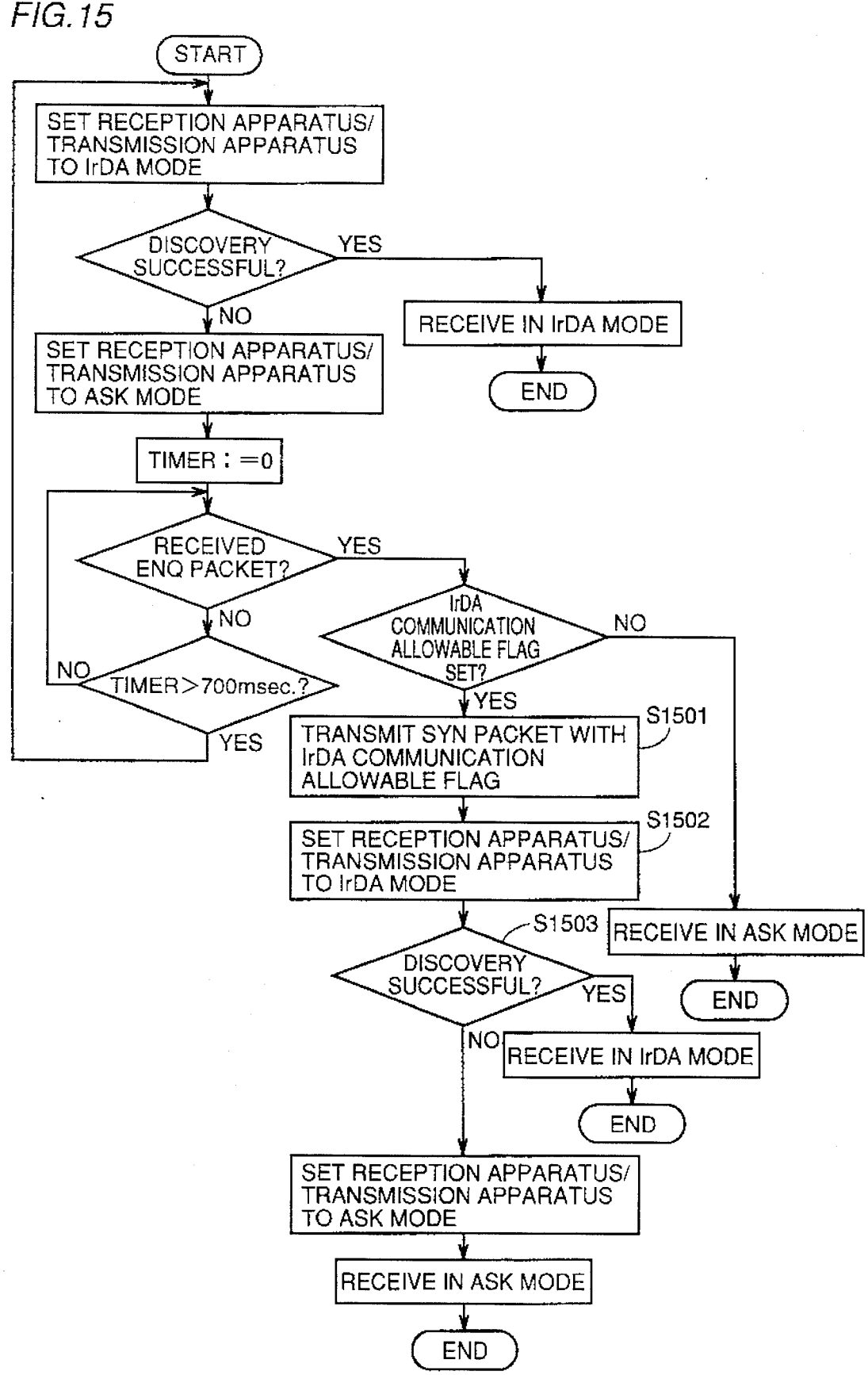

FIG. 15 shows a flow chart of the procedure of the receiving station. The flow chart of FIG. 15 is similar to the flow chart of FIG. 12 relating to the second embodiment provided that a process step is added succeeding S1208 (S1501 of FIG. 15) for setting the operation mode to the ASK mode after failing in "discovery".

When a flag indicating that communication in the IrDA mode is allowed, an IrDA communication allowable flag is set in a SYN packet to be transmitted within 30 msec. (S1501). Reception unit 1a and transmission unit 2a of the receiving station are switched to the IrDA mode (S1502). Then, connection in IrLAP is attempted for 1500 msec. (S1503). If a connection is successful, a transmission process according to the IrLAP protocol is carried out. If the connection fails, reception unit 1a and transmission unit 2a of the receiving station are set to the ASK mode, and a reception process according to the ASK system protocol is carried out.

The time period for attempting "discovery" is not limited to the above-described 1200 msec., and an arbitrary time period may be set as long as it is longer than 500 msec. that is at least required for "discovery". The "discovery" procedures of S1402 and S1503 can be carried out according to the procedure shown in FIG. 19, and FIG. 20, respectively, for example.

A time chart of establishing a connection of the present embodiment is shown.

Figure 18:
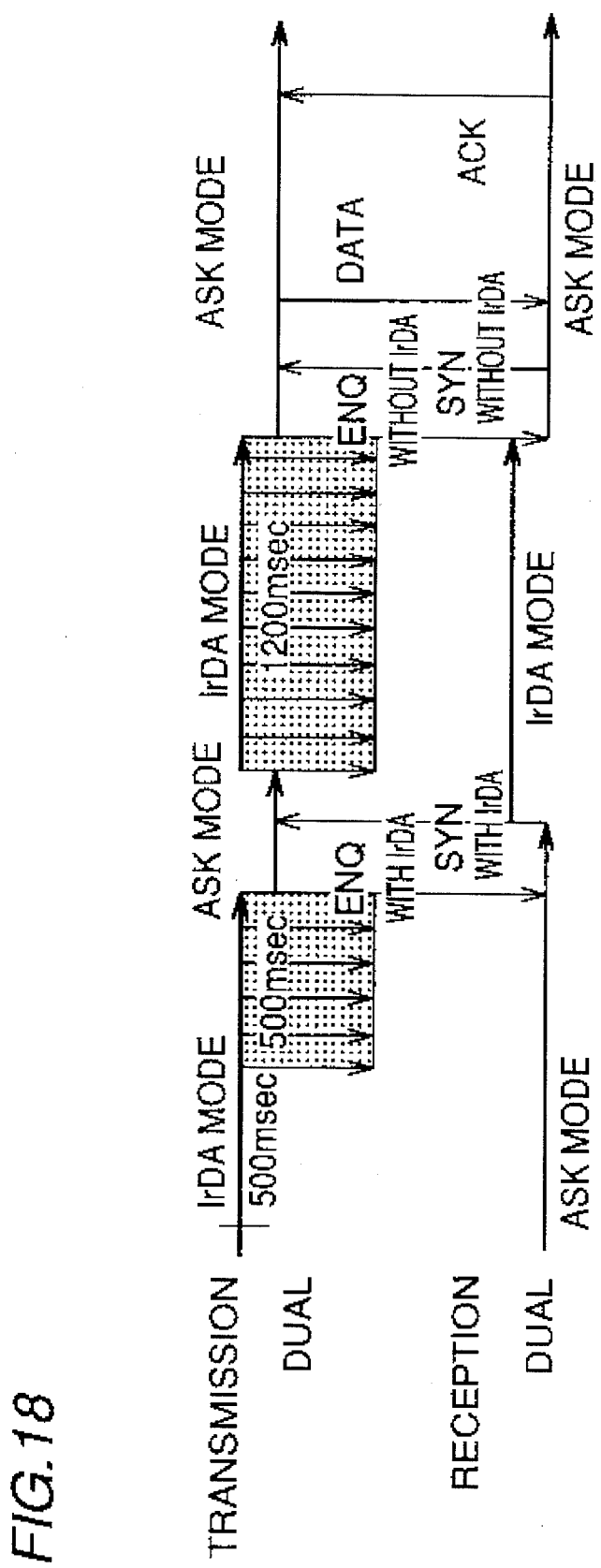
FIG. 18 is a timing chart of communication when the transmitting station and the receiving station are both the communication apparatuses of the present invention allowing both transmission and reception according to the fifth and sixth embodiments.

FIG. 18 is a time chart at the start of a communication when the transmitting station and the receiving station are both the communication apparatus of the present invention allowing both transmission and reception. FIG. 18 particularly shows the case where a communication is initiated when the transmitting station is set to the IrDA mode and the receiving station is set to the ASK mode, and then both set to the ASK mode. Eventually, both transmitting and receiving stations are set to the IrDA mode as shown in FIG. 16(*a*).

SIXTH EMBODIMENT

The present invention corresponds to the case where the communication distance of transmission of the IrDA system from the transmitting station is short, and the receiving station allows reception at the same time in both the ASK system and the IrDA system. The structures of both the transmission apparatus and the reception apparatus are similar to those of the third and fourth embodiments. The difference in function of the present embodiment from those of the third and fourth embodiments can be realized according to altering the stored contents of memory 52 of FIG. 6 indicating the process procedure.

Although not illustrated, the difference from the third embodiment in the flow chart of the receiving station is set forth in the following. A process step is added succeeding S1304 of FIG. 13 of the third embodiment for setting the operation mode to the ASK mode after failure of "discovery". More specifically, at the receiving station, when an IrDA communication allowable flag is set in the received ENQ packet, an IrDA communication allowable flag is set in a SYN packet which is transmitted within 300 msec. (S1304 of FIG. 13 of the third embodiment). A reception process according to the IrLAP protocol is carried out thereafter. When a connection is not established within 1200 msec. after transmission of a SYN packet, a reception process according to the ASK system protocol is carried out thereafter. This time period of 1200 msec. does not limit the contents of the present invention, and an arbitrary time period longer than 500 msec. at least required for "discovery" may be set.

According to the present invention, the allowable communication systems at the transmitting and receiving station can both be identified automatically even though the user does not specify which of the ASK system or the IrDA system communication is to be carried out prior to a transmission/reception operation. Since communication can be carried out according to the identified system, there is an advantage that the user does not have to specify a system.

Furthermore, communication under the more advantageous IrDA system can be ensured between apparatuses that allow communication in both systems. Therefore, data transfer can be reliably carried out at high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication apparatus comprising:

memory means for storing first and second communication protocols requiring predetermined time periods of T1 and T2, and time periods of Ra, Rb, Sa and Sb satisfying the conditions of:

(Ra+Rb)≠(Sa+Sb)
Sa>T1
Sb>T2
Rb>T2;

prior to establishing a connection with a station of another party using at least one of said first and second communication protocols;

first transmission means for transmitting a signal when said first communication protocol is executed;

first reception means for receiving a signal when said first communication protocol is executed;

second transmission means for transmitting a signal when said second communication protocol is executed;

second reception means for receiving a signal when said second communication protocol is executed;

means for counting time; and control means for controlling said first and second transmission means, said first and second reception means, and said time counting means, while referring to stored contents of said memory means, and when said communication apparatus operates as a receiving station, alternately selecting said first and second communication protocols and repeating execution of the selected protocol for said time periods of Ra and Rb, respectively, and when said communication apparatus operates as a transmitting station, alternately selecting said first communication protocol and said second communication protocol and repeating execution of the selected protocol for said time periods of Sa and Sb, respectively, wherein said control means carries out the above repetition until a connection is established with a station of another party using the currently selected protocol.

2. The communication apparatus according to claim 1, wherein said second communication protocol is more advantageous than said first communication protocol, wherein said first transmission means transmits a signal in which a flag signal is included indicating that said communication apparatus is capable of executing said second communication protocol, wherein said control means responds to said flag signal in a signal received during execution of an operation of establishing a connection in said first communication protocol to fixedly select said second communication protocol to carry out operation for connection with a station of the other party.

3. The communication apparatus according to claim 2, wherein said first and second transmission means and said first and second reception means use infrared rays as communication media.

4. The communication apparatus according to claim 3, wherein said first communication protocol is an Amplitude Shift Keying (ASK) system.

5. The communication apparatus according to claim 4, wherein said second communication protocol is an Infrared Data Association (IrDA) system.

6. The communication apparatus according to claim 5, wherein said time periods of Ra, Rb, Sa, and Sb are 700 msec., 1200 msec., 500 msec., and 1380 msec., respectively.

7. The communication apparatus according to claim 3, wherein said first and second reception means comprise common light receiving means for receiving an infrared ray and converting the same into an electric signal.

8. The communication apparatus according to claim 1, wherein said first and second transmission means and said first and second reception means use an infrared ray as communication media.

9. The communication apparatus according to claim 8, wherein said first communication protocol is an Amplitude Shift Keying (ASK) system.

10. The communication apparatus according to claim 9, where said second communication protocol is an Infrared Data Association (IrDA) system.

11. The communication apparatus according to claim 9, wherein said time periods of Ra, Rb, Sa, and Sb are 700 msec., 1200 msec., 500 msec., and 1380 msec., respectively.

12. The communication apparatus according to claim 8, wherein said first and second reception means comprise common light receiving means for receiving an infrared ray and converting the same into an electric signal.

* * * * *